US012799821B2

(12) United States Patent
Miner et al.

(10) Patent No.: US 12,799,821 B2
(45) Date of Patent: Nov. 17, 2026

(54) TRAY MECHANISMS FOR LADDERS, LADDERS INCORPORATING SAME, AND RELATED METHODS

(71) Applicant: LITTLE GIANT LADDER SYSTEMS, LLC, Springville, UT (US)

(72) Inventors: Steven S. Miner, Springville, UT (US); Travis Mittanck, Springville, UT (US); N Ryan Moss, Mapleton, UT (US); B. Scott Maxfield, Mapleton, UT (US); Tallon C. Beckstrom, Spanish Fork, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 0 days.

(21) Appl. No.: 18/527,149

(22) Filed: Dec. 1, 2023

(65) Prior Publication Data

US 2024/0183220 A1 Jun. 6, 2024

Related U.S. Application Data

(60) Provisional application No. 63/429,386, filed on Dec. 1, 2022.

(51) Int. Cl.
*E06C 7/14* (2006.01)

(52) U.S. Cl.
CPC .................................... *E06C 7/14* (2013.01)

(58) Field of Classification Search
CPC ... E06C 7/14; E06C 1/20; E06C 1/387; E06C 1/393; E06C 7/50
See application file for complete search history.

(56) References Cited

U.S. PATENT DOCUMENTS

| | | | |
|---|---|---|---|
| 199,004 | A | 1/1878 | Udell |
| 237,349 | A | 2/1881 | Webster |
| 382,102 | A | 5/1888 | Mclaughlin |

(Continued)

FOREIGN PATENT DOCUMENTS

| | | | |
|---|---|---|---|
| CA | 2037875 | A1 | 9/1992 |
| CN | 1339648 | A | 3/2002 |

(Continued)

OTHER PUBLICATIONS

International Search Report and Written Opinion for PCT/US2020/035766, dated Aug. 7, 2020.

(Continued)

*Primary Examiner* — Kimberly T Wood
(74) *Attorney, Agent, or Firm* — Dorsey & Whitney LLP

(57) ABSTRACT

Ladder configurations and components are provided including a first assembly of rails and a second assembly of rails that are pivotable relative to each other between a collapsed configuration and an expanded configuration. A tray rotatably connected to a top cap of the ladder may include a convertible compartment, a pair of clamps, attachment points, and a ferromagnetic component. The tray may be rotatable relative to the top cap by operation of an adjustment member that locks or unlocks the tray. Rotation of the tray may position the tray in an upright position substantially parallel to the first assembly of rails and in a storage position substantially parallel to and behind the first assembly of rails.

11 Claims, 33 Drawing Sheets

(56) References Cited

U.S. PATENT DOCUMENTS

| | | | | | |
|---|---|---|---|---|---|
| 523,709 | A | | 7/1894 | Leach | |
| 638,332 | A | * | 12/1899 | Hendricks | A45F 5/021 224/679 |
| 1,934,086 | A | | 11/1933 | Page | |
| 2,109,886 | A | | 3/1938 | Lewis | |
| 2,470,053 | A | | 5/1949 | Salisbury | |
| 3,189,123 | A | | 6/1965 | Bond | |
| 4,040,549 | A | | 8/1977 | Sadler | |
| 4,979,590 | A | * | 12/1990 | Bailey | E06C 7/14 248/238 |
| 5,052,581 | A | * | 10/1991 | Christ | E06C 7/14 220/570 |
| 5,062,179 | A | | 11/1991 | Huang | |
| 5,236,161 | A | * | 8/1993 | Haven | E06C 7/14 220/570 |
| 5,419,409 | A | * | 5/1995 | Corulla | E06C 7/16 182/174 |
| 5,462,318 | A | * | 10/1995 | Cooke | E05C 19/14 292/113 |
| 5,505,302 | A | | 4/1996 | Ferley | |
| 5,520,474 | A | | 5/1996 | Liu | |
| 5,542,151 | A | | 8/1996 | Stranski et al. | |
| 5,603,405 | A | | 2/1997 | Smith | |
| 5,613,574 | A | * | 3/1997 | Melanson | E06C 7/14 248/238 |
| 5,622,278 | A | * | 4/1997 | Fries | E06C 7/14 220/527 |
| 5,639,003 | A | | 6/1997 | Utzinger | |
| 5,722,507 | A | | 3/1998 | Kain | |
| 5,740,883 | A | | 4/1998 | Trank | |
| 5,782,314 | A | | 7/1998 | Zeitler | |
| 5,913,380 | A | * | 6/1999 | Gugel | E06C 7/14 248/210 |
| 5,941,344 | A | | 8/1999 | Spadaro | |
| 6,086,284 | A | | 7/2000 | Callahan | |
| 6,443,260 | B1 | * | 9/2002 | Katz | E06C 7/14 248/238 |
| 6,910,429 | B1 | * | 6/2005 | Matay | B25H 3/06 108/44 |
| 7,032,711 | B1 | * | 4/2006 | Katz | B25H 3/06 248/238 |
| 7,063,187 | B1 | | 6/2006 | Lavigne | |
| 7,264,084 | B1 | | 9/2007 | Switzer | |
| 7,424,933 | B2 | * | 9/2008 | Weiss | E06C 7/084 182/163 |
| 7,617,569 | B2 | | 11/2009 | Liao | |
| 7,931,123 | B2 | | 4/2011 | Moldthan et al. | |
| 7,984,790 | B2 | | 7/2011 | Meyers et al. | |
| 8,186,481 | B2 | | 5/2012 | Moss et al. | |
| 8,453,796 | B2 | | 6/2013 | Astor et al. | |
| 8,579,083 | B2 | | 11/2013 | Astor | |
| 9,163,455 | B2 | | 10/2015 | Moss et al. | |
| 9,422,767 | B2 | | 8/2016 | Russell et al. | |
| 9,714,542 | B1 | | 7/2017 | Harcz | |
| 9,784,033 | B2 | | 10/2017 | Moss et al. | |
| 9,850,706 | B2 | | 12/2017 | Astor et al. | |
| 10,138,680 | B2 | * | 11/2018 | Williams | E06C 7/14 |
| 10,767,417 | B2 | | 9/2020 | Andrade | |
| 10,807,407 | B1 | | 10/2020 | Huynh | |
| 11,255,126 | B1 | * | 2/2022 | Adams | E06C 7/143 |
| 11,299,934 | B2 | | 4/2022 | Brown et al. | |
| 12,000,211 | B2 | * | 6/2024 | Mittanck | E06C 7/14 |
| 2002/0017430 | A1 | * | 2/2002 | Rosko | E06C 1/393 248/238 |
| 2002/0104709 | A1 | * | 8/2002 | Hines | B25H 3/006 182/129 |
| 2003/0029676 | A1 | * | 2/2003 | Gibson | E06C 1/393 182/161 |
| 2003/0077111 | A1 | | 4/2003 | Cheng | |
| 2005/0067311 | A1 | * | 3/2005 | Ferrante | E06C 1/39 248/210 |
| 2005/0258002 | A1 | * | 11/2005 | Sabo | E06C 7/14 182/129 |
| 2005/0274575 | A1 | | 12/2005 | Gibson | |
| 2006/0070806 | A1 | * | 4/2006 | Simpson | E06C 7/14 182/129 |
| 2006/0219586 | A1 | * | 10/2006 | Phillips | B44D 3/123 206/561 |
| 2007/0284191 | A1 | * | 12/2007 | Astor | E06C 7/00 182/129 |
| 2008/0141495 | A1 | * | 6/2008 | Fisher | A63H 33/008 16/343 |
| 2008/0142301 | A1 | | 6/2008 | Meyers et al. | |
| 2009/0078504 | A1 | * | 3/2009 | Astor | E06C 1/39 182/129 |
| 2009/0229918 | A1 | | 9/2009 | Moss et al. | |
| 2017/0234069 | A1 | | 8/2017 | Pfeifer | |
| 2017/0328131 | A1 | | 11/2017 | Woodward et al. | |
| 2018/0023345 | A1 | * | 1/2018 | Andrade | A47B 5/04 108/25 |
| 2018/0030783 | A1 | | 2/2018 | Moss et al. | |
| 2018/0187488 | A1 | | 7/2018 | Mora et al. | |
| 2018/0238113 | A1 | | 8/2018 | Wulfekotte | |
| 2018/0298691 | A1 | | 10/2018 | Cook et al. | |
| 2019/0264505 | A1 | | 8/2019 | Dangrow et al. | |
| 2019/0376341 | A1 | | 12/2019 | Maxfield et al. | |
| 2020/0165869 | A1 | | 5/2020 | Brown et al. | |
| 2020/0190905 | A1 | | 6/2020 | Foley | |
| 2020/0217134 | A1 | | 7/2020 | Fortier | |
| 2020/0254605 | A1 | * | 8/2020 | McGee | B25H 3/06 |
| 2020/0263497 | A1 | | 8/2020 | Leng | |
| 2020/0270946 | A1 | | 8/2020 | Lawery et al. | |
| 2020/0386050 | A1 | | 12/2020 | Mittanck et al. | |
| 2021/0254406 | A1 | | 8/2021 | Brown et al. | |
| 2022/0145700 | A1 | | 5/2022 | Major et al. | |
| 2022/0195801 | A1 | | 6/2022 | Gericke et al. | |

FOREIGN PATENT DOCUMENTS

| | | | | | |
|---|---|---|---|---|---|
| CN | 201729096 | U | | 2/2011 | |
| CN | 205044603 | U | | 2/2016 | |
| CN | 108349552 | A | | 7/2018 | |
| CN | 209976451 | U | | 1/2020 | |
| CN | 210174700 | U | | 3/2020 | |
| KR | 200146389 | Y1 | | 6/1999 | |
| WO | WO-9909289 | A2 | * | 2/1999 | B25H 3/06 |

OTHER PUBLICATIONS

International Search Report and Written Opinion of PCT Application No. PCT/US2021/053784 dated Jan. 21, 2022.

PCT/US2023/082191 International Search Report and Written Opinion dated Mar. 15, 2024 (12 pages).

Search Report and First Office Action in China Patent Application No. 202180074828.X.

* cited by examiner

TRAY MECHANISMS FOR LADDERS, LADDERS INCORPORATING SAME, AND RELATED METHODS

CROSS-REFERENCE TO RELATED APPLICATIONS

This claims the benefit of and priority to U.S. Provisional Patent Application No. 63/429,386, entitled "TRAY MECHANISMS FOR LADDERS, LADDERS INCORPORATING SAME, AND RELATED METHODS" and filed 1 Dec. 2022, the entire disclosure of which is hereby incorporated by reference.

TECHNICAL FIELD

The present disclosure generally relates to ladders, ladder systems, ladder components, and related methods and, more specifically, to trays, top caps, handles, grips, and related methods of manufacturing and operating the same in ladders, stools, and related devices.

BACKGROUND

Ladders are conventionally used to provide a user thereof with improved access to locations that might otherwise be inaccessible. Ladders come in many shapes and sizes, such as straight ladders, straight extension ladders, stepladders, and combination step and extension ladders. So-called combination ladders incorporate, in a single ladder, many of the benefits of other ladder designs.

Ladders are common tools for professional tradesman and homeowners alike. Sometimes the use of a ladder can be an awkward experience, even for those who use ladders on a regular basis, when certain tasks are to be performed while standing on a ladder. For example, it can be easy to lose one's balance on a ladder while working on an overhead project (e.g., painting a ceiling, changing a light bulb, etc.) Moreover, carrying and holding various tools and supplies can be challenging while on a ladder. There are also opportunities for improving the ergonomics, manufacturability, and stability of ladders for various applications. For these and other reasons, there is a constant need for improvements to ladders and related components.

SUMMARY

One aspect of the present disclosure relates to a ladder, comprising: a first assembly including a first pair of rails and a plurality of rungs extending between and coupled to the first pair of rails; a second assembly including a second pair of rails, the second pair of rails being pivotally displaceable relative to the first pair of rails between a collapsed configuration and an expanded configuration; a top cap coupled to the first pair of rails; and a tray coupled to and extending rearward from the top cap, with the tray comprising a convertible compartment having a bottom aperture and a panel rotatable between a first position exposing the bottom aperture and a second position covering the bottom aperture and defining a bottom surface of the convertible compartment.

In some embodiments, the panel comprises a table insertable into a retention recess formed in the tray. A part of the panel may be resiliently deflectable to lock the panel relative to the tray. The tray may further comprise a set of attachment points at a top end of the convertible compartment.

At least one clamp may be included that is movable between a retention position and a release position relative to the top cap or the tray. The at least one clamp may be rotatable between the release position and the retention position. The at least one clamp may be lockable in the retention position, may be positioned above a top surface of the tray adjacent to the convertible compartment, or may be positioned on a front surface of the top cap.

In some embodiments, the ladder may further comprise a ferromagnetic component positioned adjacent to the convertible compartment. The ferromagnetic component may be positioned on or in a sidewall of the convertible compartment.

Another aspect of the disclosure relates to a ladder, comprising: a first assembly including a first pair of rails and a plurality of rungs extending between and coupled to the first pair of rails; a second assembly including a second pair of rails, the second pair of rails being pivotally displaceable relative to the first pair of rails between a collapsed configuration and an expanded configuration; a top cap coupled to the first pair of rails; a tray coupled to and extending rearward from the top cap; and a pair of clamps coupled to the top cap or to the tray, the pair of clamps being movable between a locked position and an unlocked position.

In some embodiments, each clamp of the pair of clamps may be pivotally coupled with the tray. Each clamp of the pair of clamps may be pivotally coupled with the top cap. The pair of clamps may be pivotable about a respective pair of horizontal pivot axes. The pair of clamps may pivotable about a respective pair of vertical pivot axes.

Yet another aspect of the disclosure relates to a tray for a ladder, comprising: a body attachable to a top cap of a ladder; a convertible compartment formed in the body and having a bottom aperture; and a panel positioned in the convertible compartment and rotatable between a first position covering the aperture and a second position exposing the bottom aperture, wherein the panel is lockable in the second position relative to the body.

The body may comprise at least one hinge portion configured to be rotatably coupled with the top cap. The panel may be lockable in the first position relative to the body. The tray may further comprise at least one elongated member pivotally coupled with the body and movable relative to the body between an open position and a closed position.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
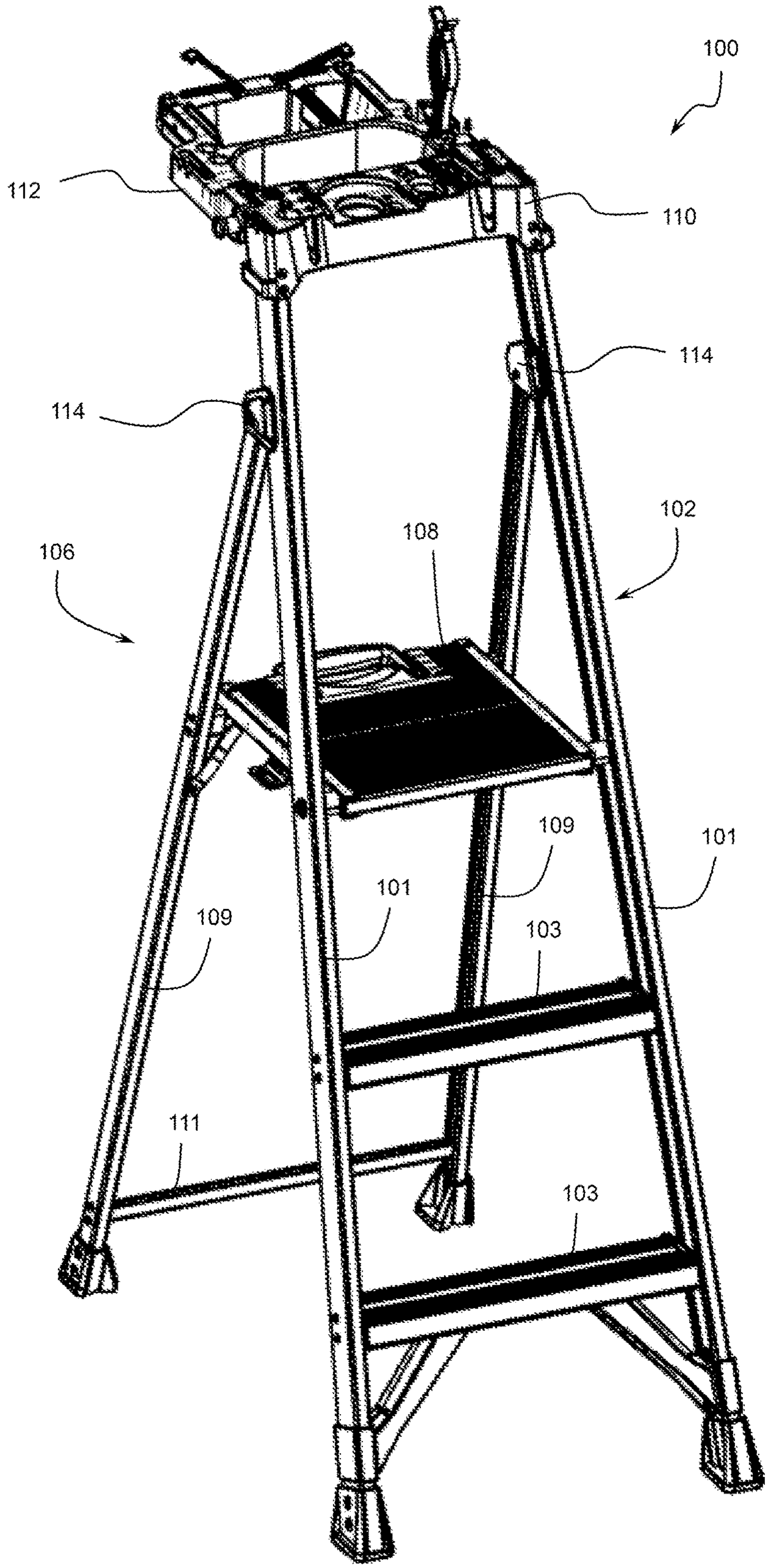
FIG. 1 is an isometric view of a ladder with a tray in a horizontal configuration.
Figure 2:
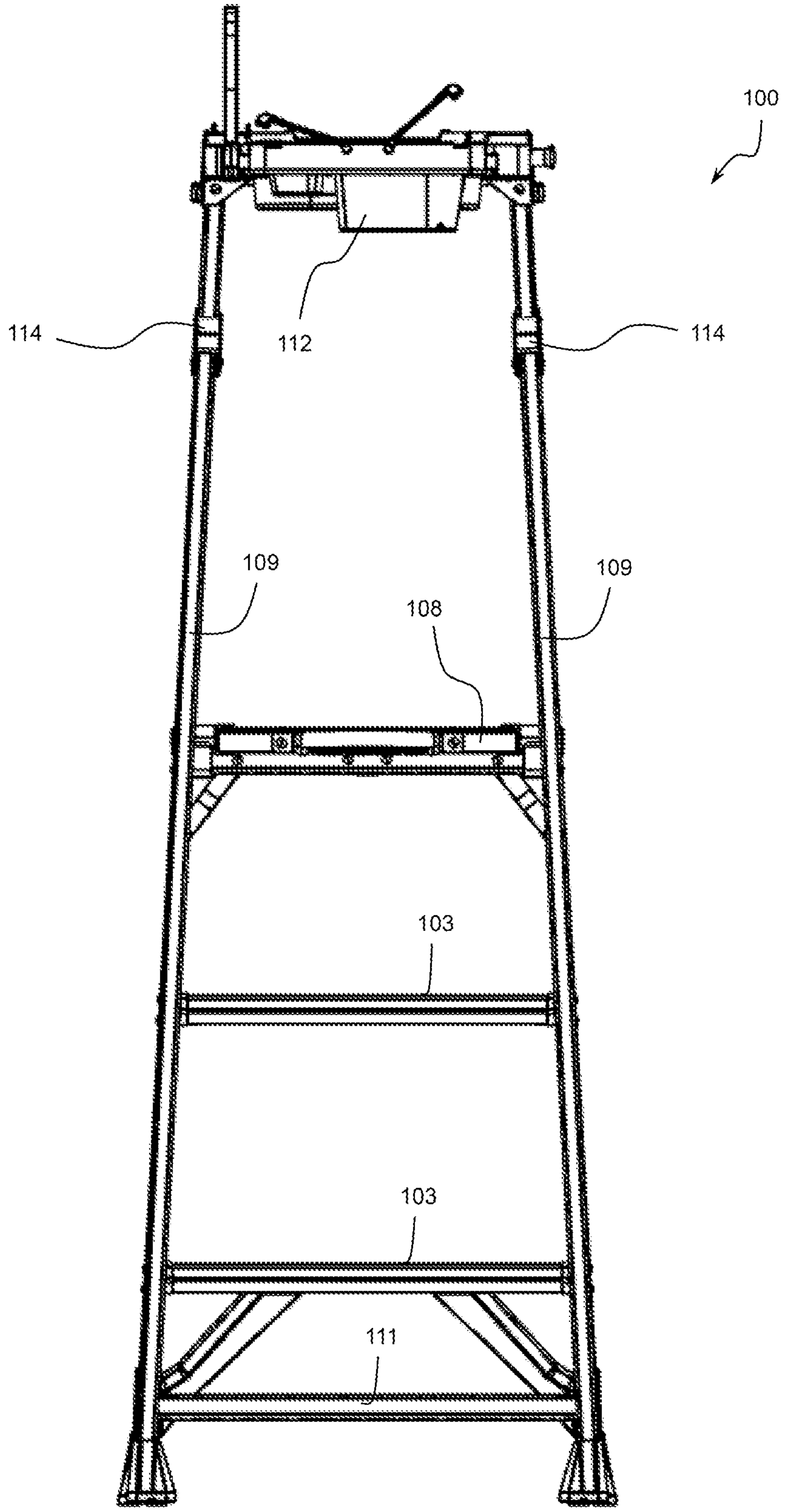
FIG. 2 is a rear view of the ladder of FIG. 1.
Figure 3:
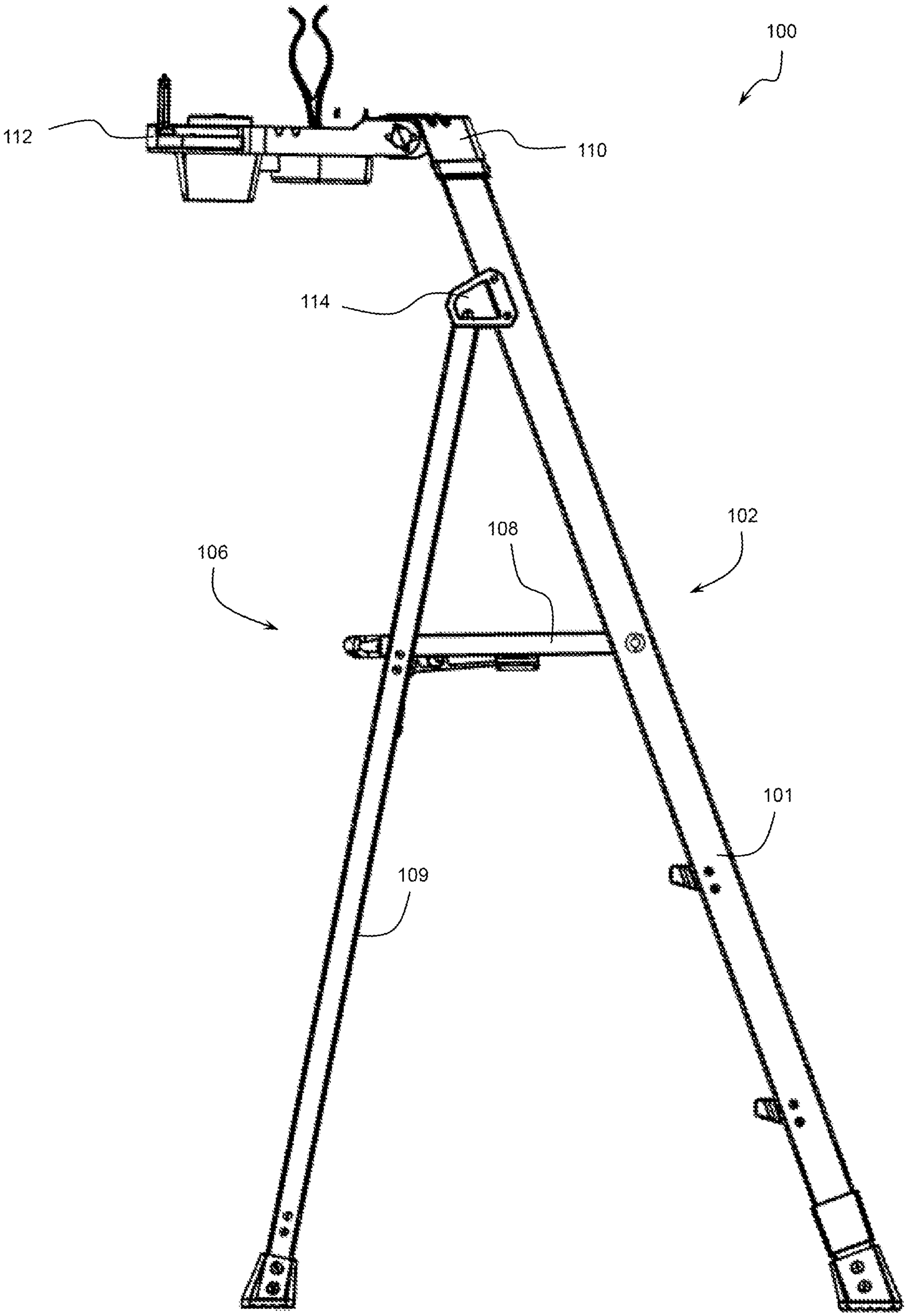
FIG. 3 is a left side view of the ladder of FIG. 1.
Figure 4:
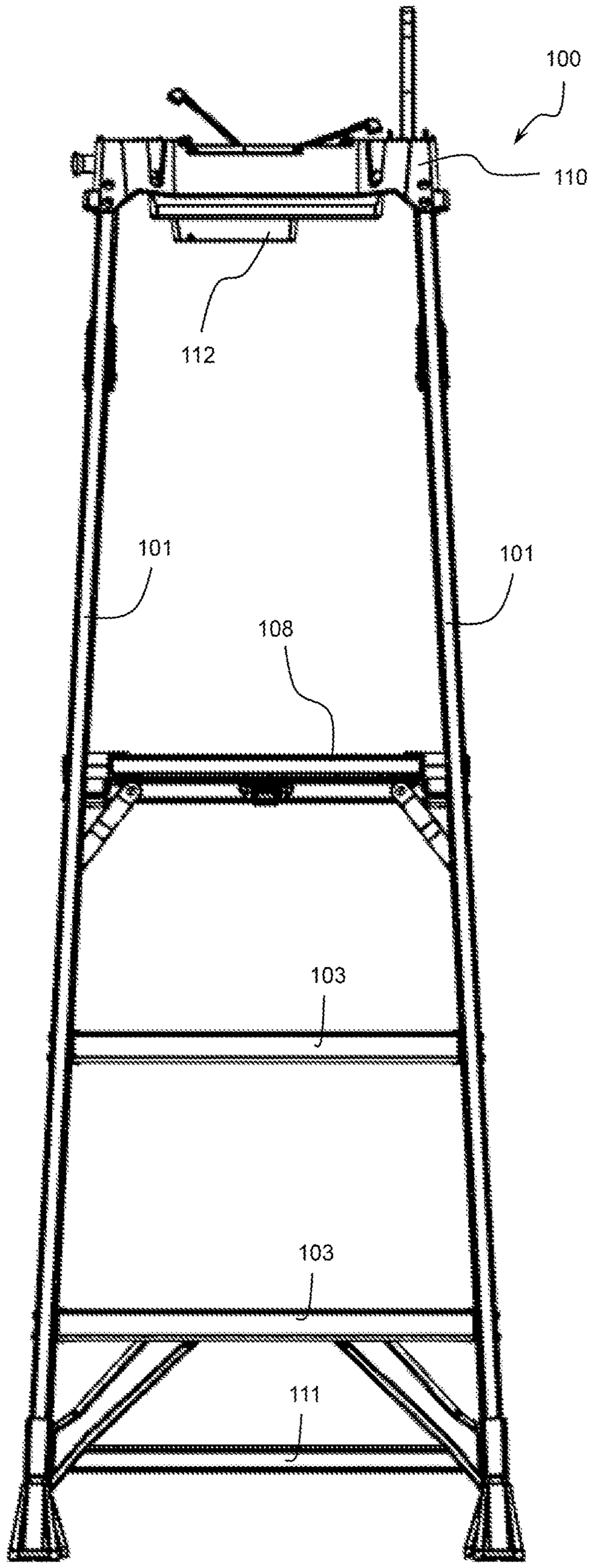
FIG. 4 is a front view of the ladder of FIG. 1.
Figure 5:
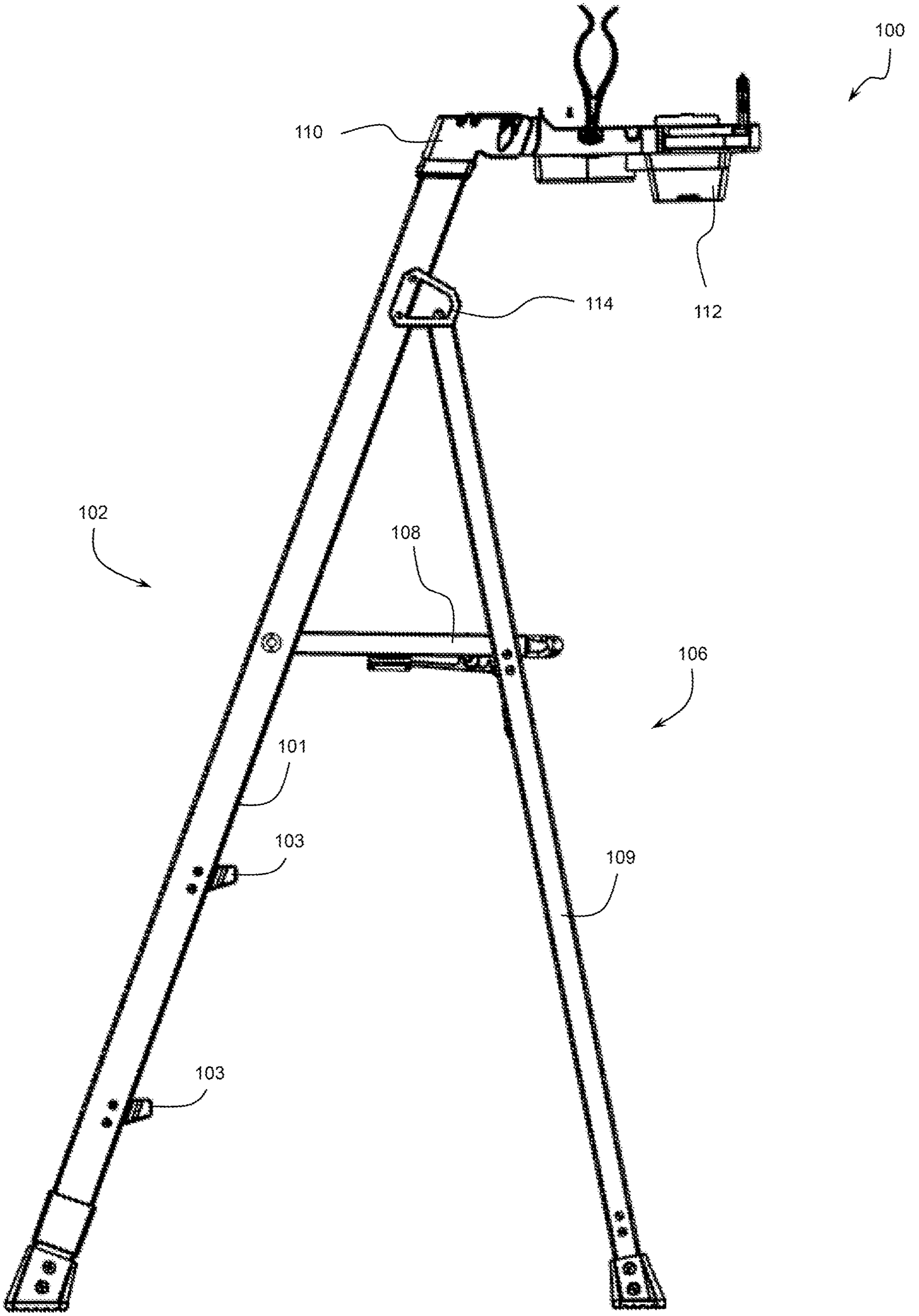
FIG. 5 is a right side view of the ladder of FIG. 1.
Figure 6:
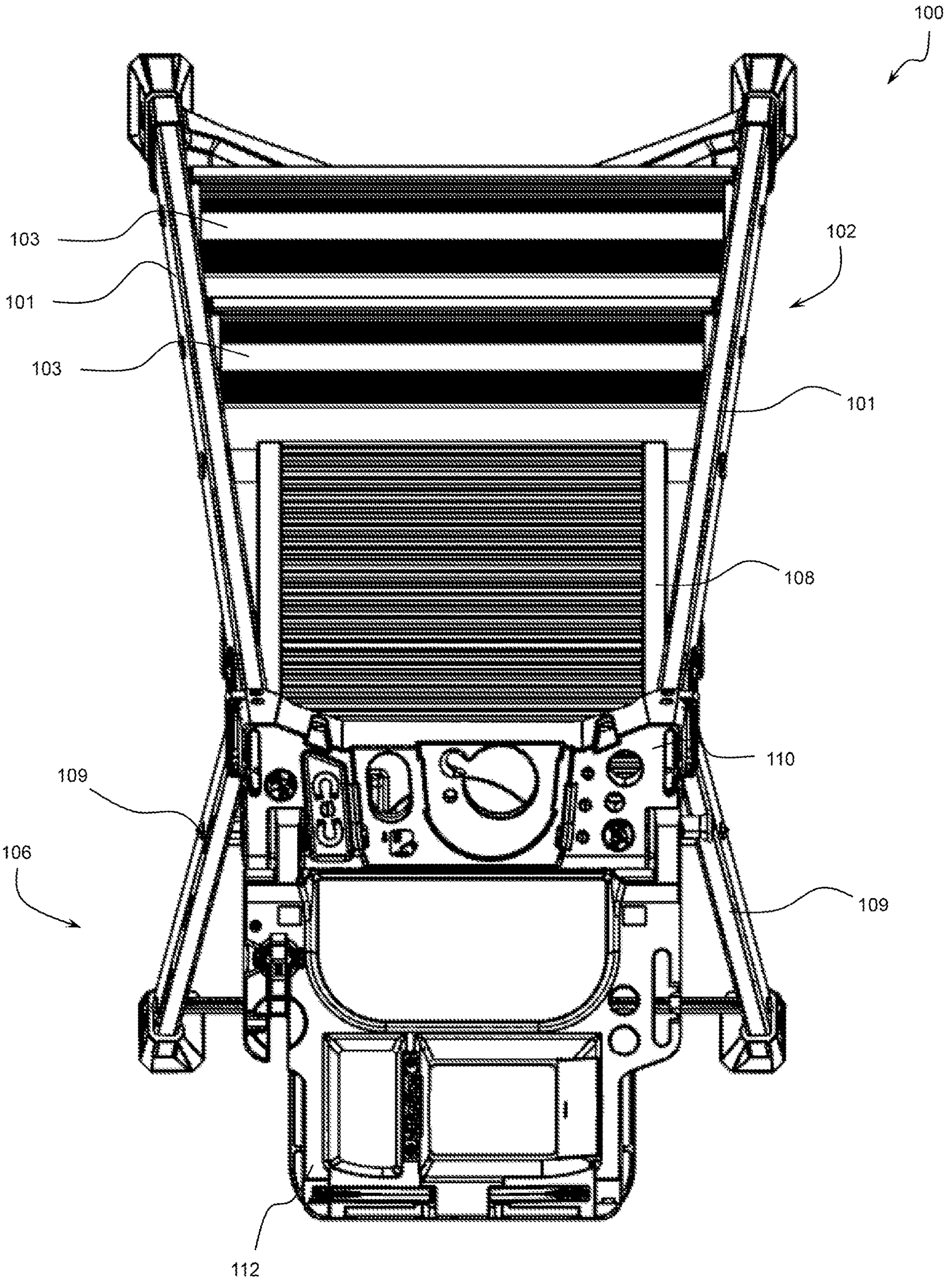
FIG. 6 is a top view of the ladder of FIG. 1.
Figure 7:
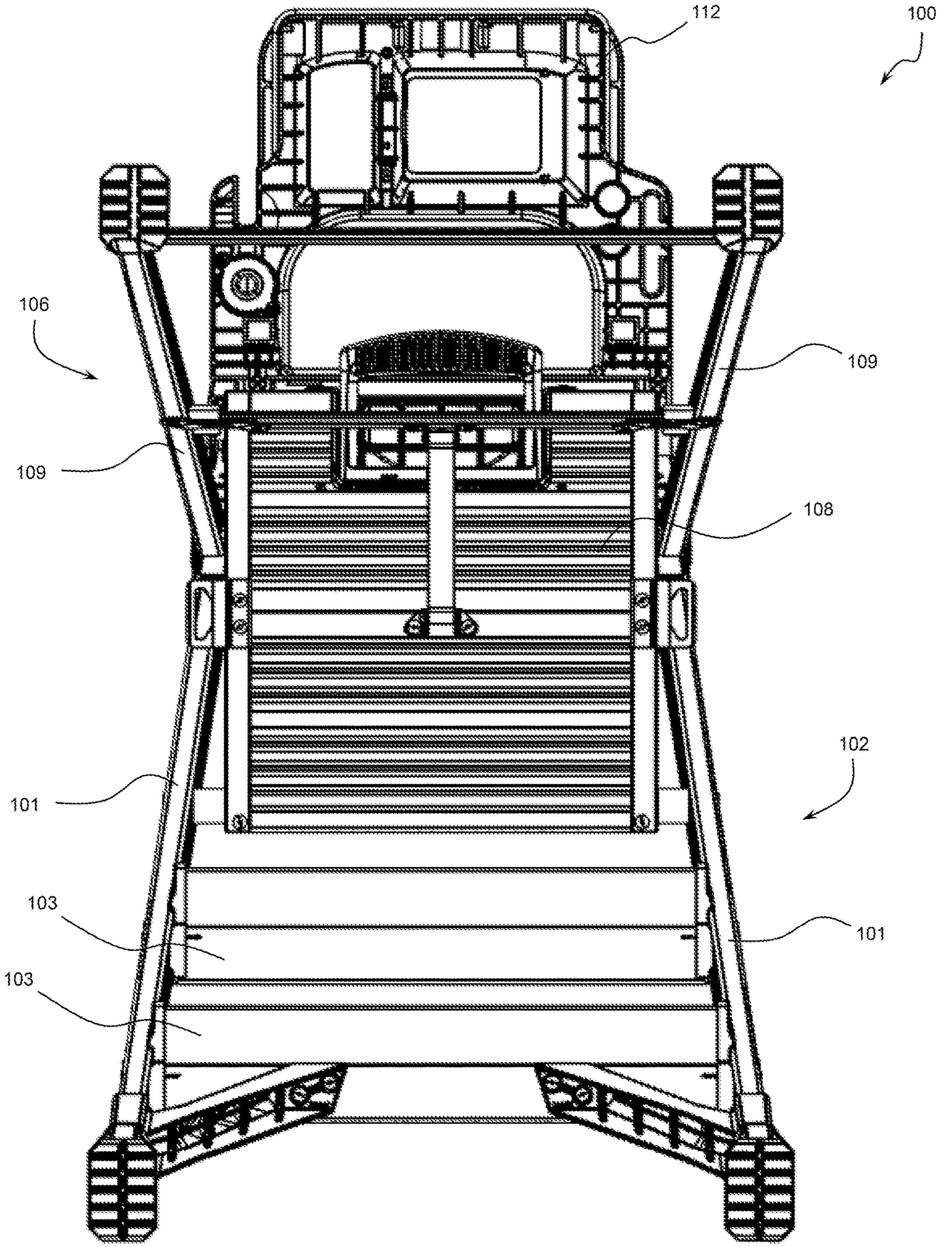
FIG. 7 is a bottom view of the ladder of FIG. 1.
Figure 8:
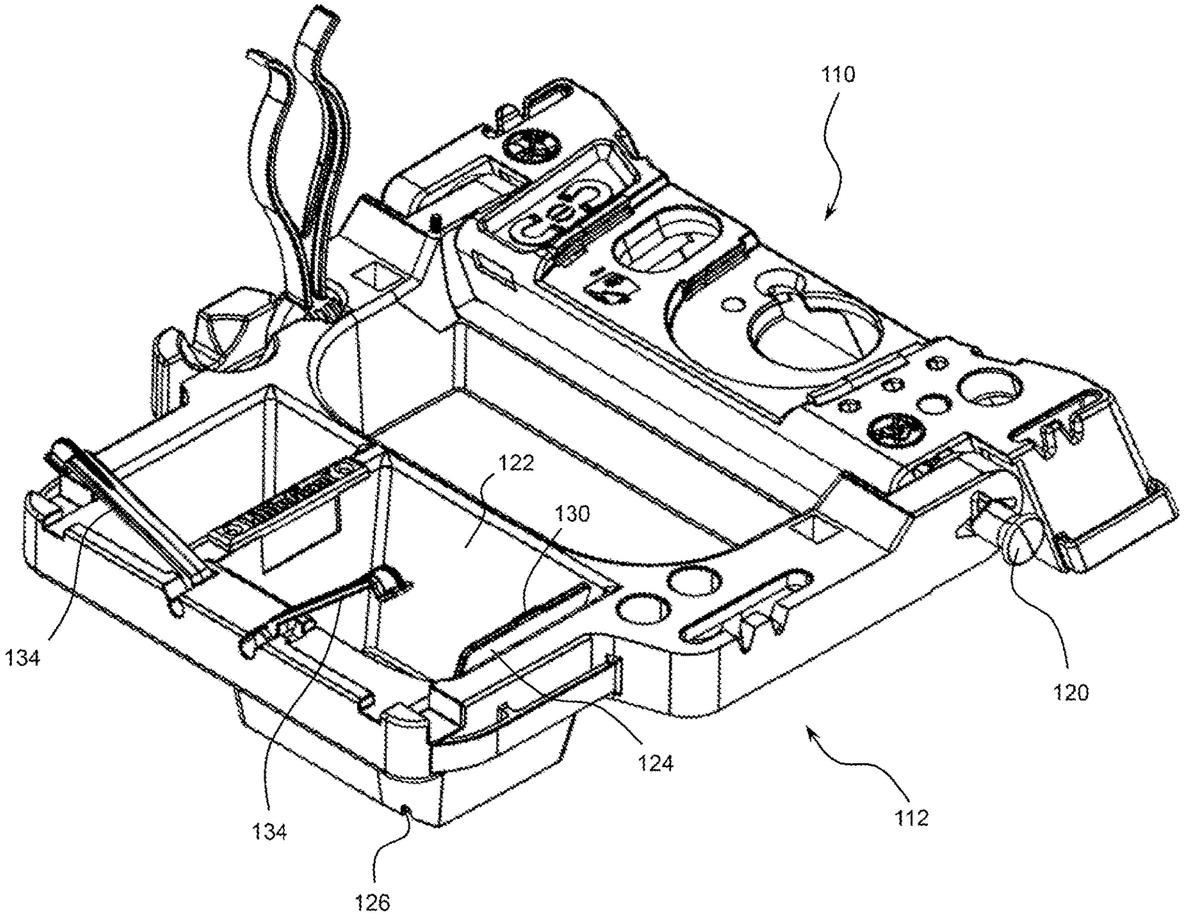
FIG. 8 is an isometric view of a tray and top cap.
Figure 9:
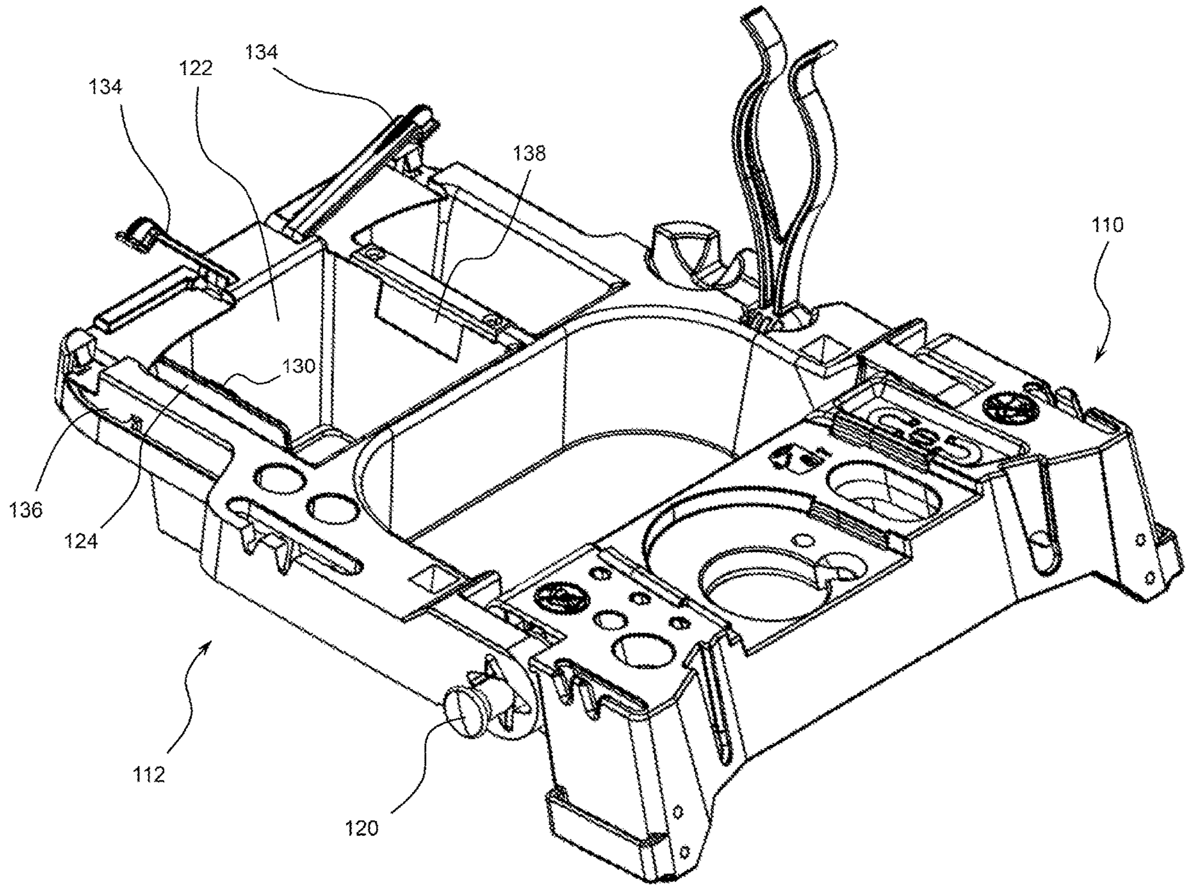
FIG. 9 is an isometric view of the tray and top cap of FIG. 8.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

FIGS. 1-7 show various isometric and side views of a ladder 100 according to an embodiment of the present disclosure. The ladder 100 may comprise a first assembly 102 (i.e., a first rail assembly or front rail assembly) including a first pair of rails 101 (e.g., front rails or primary rails) and a plurality of rungs 103 (i.e., steps or lateral supports) extending between, and coupled to, the first pair of rails 101. The ladder 100 may further include a second assembly 106 (i.e., a second rail assembly or rear rail assembly) including a second pair of rails 109 (e.g., rear or support rails) and one or more cross-braces 111 (e.g., rear horizontal struts or lateral supports). However, in the embodiment shown, the second assembly 106 does not include rungs for a user to climb on. Such a configuration is conventional for many stepladder configurations. However, in other embodiments, the second assembly 106 may include rungs and may be configured to support a user, for example, similar to the first assembly 102. The rungs 103 and cross-braces 111 may stiffen the first assembly 102 and second assembly 106, respectively, and may provide structural rigidity to the ladder 100.

The first pair of rails 101 may be coupled to a top cap 110. One of the first and second assemblies 102 and 106 (or both) may be configured to pivot relative to the top cap 110 such that the assemblies 102 and 106 may be displaced toward each other to a compact storage configuration (i.e., a flattened, folded, or collapsed configuration with front and rear feet 105 of the first and second assemblies 102, 106 approximated), as will be appreciated by those having ordinary skill in the art and the benefit of the present disclosure. A free-standing configuration (i.e., an A-frame, expanded, or spread configuration) is shown in FIG. 1. The top cap 110 may include a number of features to enhance the efficiency and usability of the ladder 100, such as tool and part receptacles, handles, grips, safety alerts, and other features. A platform 108 may be coupled with the first assembly 102 and may be movable between a storage position and the expanded/standing position shown in FIGS. 1-7. While in the expanded/standing position, the platform 108 may lock the first and second assemblies 102, 106 relative to each other in their respective standing positions. The rear rails 109 may be pivotally coupled to the front rails 101 at a pair of hinges 114 extending rearward from the front rails 101.

The top cap 110 may be pivotally coupled to a tray 112 configured to provide multiple functions and to support tools, supplies, and the user in various configurations. In one configuration, the tray 112 may have a body structure that extends rearward from the back side of the top cap 110 in a substantially horizontal direction, as shown, for example, in FIGS. 1-7. The tray 112 may also be pivotable between the horizontal position (i.e., a platform position) and a raised position (i.e., a handle or user support position) or a lowered position (i.e., a stowed or collapsed position). Detailed isometric and side views of the tray 112 are shown in FIGS. 8-13. The tray 112 is shown in an upward extending configuration in FIGS. 14-21, and it is shown in a folded or collapsed, downward-extending configuration in FIGS. 22-29.

The tray 112 may comprise an adjustment member 120 (e.g., a shaft, pin, handle, or button) operable between a locked position and an unlocked position. In the locked position of the adjustment member 120, the tray 112 may be prevented from pivoting relative to the top cap 110. The adjustment member 120 may cause mechanical interference with the tray 112 that keeps it in its current orientation relative to the top cap 110. In the unlocked position of the adjustment member 120, the adjustment member 120 may be moved relative to the locked position and may therefore allow rotation of the tray 112 relative to the top cap 110. For example, while the adjustment member 120 is in the unlocked position, the tray 112 may move from the position shown in FIG. 14 to the position in FIG. 1 or 22. In some embodiments, the adjustment member 120 may be moved from the locked position to the unlocked position by axially pushing or pulling on the adjustment member 120. In some embodiments, a user may only need to operate the adjustment member 120 with one hand to move between a locked position and an unlocked position.

The tray 112 may comprise a convertible compartment 122 configurable in a pass-through configuration and a retention configuration. The convertible compartment 122 is shown in the pass-through configuration in FIGS. 8-10 (e.g., an open configuration) and is shown in the retention configuration in FIGS. 11-12 (e.g., a closed configuration). The convertible compartment 122 may include a rotatable panel 124 pivotally coupled with lateral and/or bottom sides of the compartment 122. For example, the rotatable panel 124 may comprise a pair of pivot posts 125 configured to be inserted into a corresponding pair of pivot openings 126 in the sides of the convertible compartment 122. See FIGS. 8, 10, 12, and 13. When in a substantially horizontal position, the rotatable panel 124 may act as a bottom panel or bottom support for the convertible compartment 122. When in an upward rotated position, the rotatable panel 124 may expose an aperture 128 (see FIG. 10) through the bottom end of the convertible compartment 122. Accordingly, the convertible compartment 122 may be in the retention configuration while the rotatable panel 124 is covering the aperture 128, and the compartment may be in the pass-through configuration while the rotatable panel 124 exposes the aperture 128.

While in the retention configuration, the convertible compartment 122 can be used to hold objects (e.g., tools, supplies, trash, etc.) on the tray 112 without those objects falling through the tray 112. In some embodiments, a paint cup or tray can be placed in the convertible compartment 122 while supported from below by the rotatable panel 124. The rotatable panel 124 may comprise a tab 130 insertable into a retention recess 132 on an opposite side of the convertible compartment 122 from the pair of pivot posts 125 and the pair of pivot openings 126. The tab 130 (or a larger part of the rotatable panel 124) may be resiliently deflectable so that it "snaps" or elastically bends or compresses to lock the rotatable panel 124 in the horizontal position relative to the rest of the convertible compartment 122. The resilience of the tab 130 or panel 124 may require a minimum threshold force or moment to be applied to the rotatable panel 124 in order to "snap" or dislodge the tab 130 from the retention recess 132. This may beneficially ensure that the panel 124 does not swing relative to the tray 112 while the ladder 100 is carried or when the tray 112 is being repositioned to the raised or lowered positions.

The convertible compartment 122 may also beneficially be used while the rotatable panel 124 is in the open position (i.e., shown in FIG. 10) as a location for supporting large or long tools. A handle, pole, or other elongated portion of the tool may be inserted through the aperture 128 while a broader or wider portion of the tool is supported by a top surface of the tray 112. In some embodiments, the aperture 128 may receive a bag or other flexible receptacle. The bag may hang through the aperture 128 to expand the volume into which objects may be stored at the convertible compartment 122. The tray 112 may comprise a set of attachment points (e.g., hooks (e.g., 133), clamps (e.g., 134), slots (e.g., 136), magnets (e.g., 138), similar features, or combinations thereof; see FIG. 10) surrounding the top opening of the convertible compartment 122 to which the sides or open end of the bag can be attached while the bottom of the bag extends through the aperture 128. In this manner, weight in the bottom of the bag may be supported by the bag via the attachment points, and the bag may be prevented from falling through the aperture 128.

The convertible compartment 122 may be positioned adjacent to a ferromagnetic component 138 positioned in or on a surface of the tray 112. In some embodiments, the ferromagnetic component 138 may comprise a permanent magnet configured to emit a magnetic field through a sidewall of the convertible component 122 or through a top surface of the tray 112 at a point on the upper perimeter of the convertible compartment 122. The ferromagnetic component 138 may have a magnetic field strength sufficient to magnetically couple a typical hand paintbrush (e.g., a paintbrush having a width between about 1-inch to about 3-inches) against the sidewall of the convertible compartment 122 or against the ferromagnetic component 138 itself such that the bristles of the paintbrush are suspended above the rotatable panel 124. Additionally, a paintbrush may be positioned lying horizontally above the ferromagnetic component 138, with its bristles overhanging the upper end of the convertible compartment 122. Thus, paint on the brush may drip into the convertible compartment 122 (e.g., into a cup or bag positioned in the convertible compartment 122) in a manner that may help a user prevent spills or other unwanted paint drips elsewhere. Additionally, the magnetic attraction of the brush to the component 138 may help secure the brush in place even as the tray 112 or ladder 100 are repositioned.

A pair of clamps 134 (e.g., lockable gates, clips, or retainable hooks) may be positioned at an end of the tray 112 opposite the top cap 110. In some examples, the pair of clamps 134 include at least one elongated body. See also clamps 3034 in FIGS. 30-34 and their related descriptions elsewhere herein which can implement the features and characteristics of clamps 134. The clamps 134 may each be rotatable or pivotable between an unlocked position (i.e., a raised, open, or release position) shown in FIGS. 8-10 and a locked position (i.e., a closed, lowered, or retention position) shown in FIGS. 11-13. In some examples, the clamps 134 pivot about a respective pair of vertical pivot axes between the unlocked position and the locked position shown in FIGS. 8-13. FIG. 13 is a section view taken through section lines 13-13 in FIG. 10 (but with the clamps 134 rotated to their locked position). The clamps 134 may be substantially elongated and may extend in opposite directions from each other and away from the midpoint between them on the tray 112. The outer ends of the clamps 134 may be snap-fit or interference-fit into recesses or protrusions in the tray 112 in a manner that requires a minimum amount of force or moment to pivot the clamps 134 out of their locked positions.

Hook-shaped legs or tabs on a roller brush paint tray may be captured between the clamps 134 and the top surface of the tray 112 so as to prevent the paint tray from falling from the top of the ladder tray 112. For this reason, the clamps 134 may have their pivoting ends 140 coupled to the tray 112 at their laterally internal ends so that a user can press the clamps 134 into their locked positions from the lateral outer sides of the tray 112 (and the paint tray). Typically, the paint tray will have a bottom panel that would cover the center of the tray 112 in a manner that may make it more challenging to couple the clamps 134 to the tray 112 while the paint tray is in that position. The pivoting ends 140 of the clamps 134 can pivot about substantially horizontal pivot axes (e.g., axes parallel to the top surface of the tray 112) between their locked and unlocked positions. The clamps 134 can hold down the legs of a paint tray (or another horizontal member positioned between the clamps 134 and tray 112) and can therefore resist upward movement of the legs away from the tray 112.

In some configurations, the clamps 134 may be used to couple a bag or other hanging object to the tray 112. For instance, the clamps 134 may be pressed into their locked positions while a portion of the object is positioned between the clamp 134 and the tray 112, and the retention of the outer clamp end to the tray 112 may cause the clamp 134 to apply pressure to the object to hold it in place relative to the tray 112.

Figure 11:
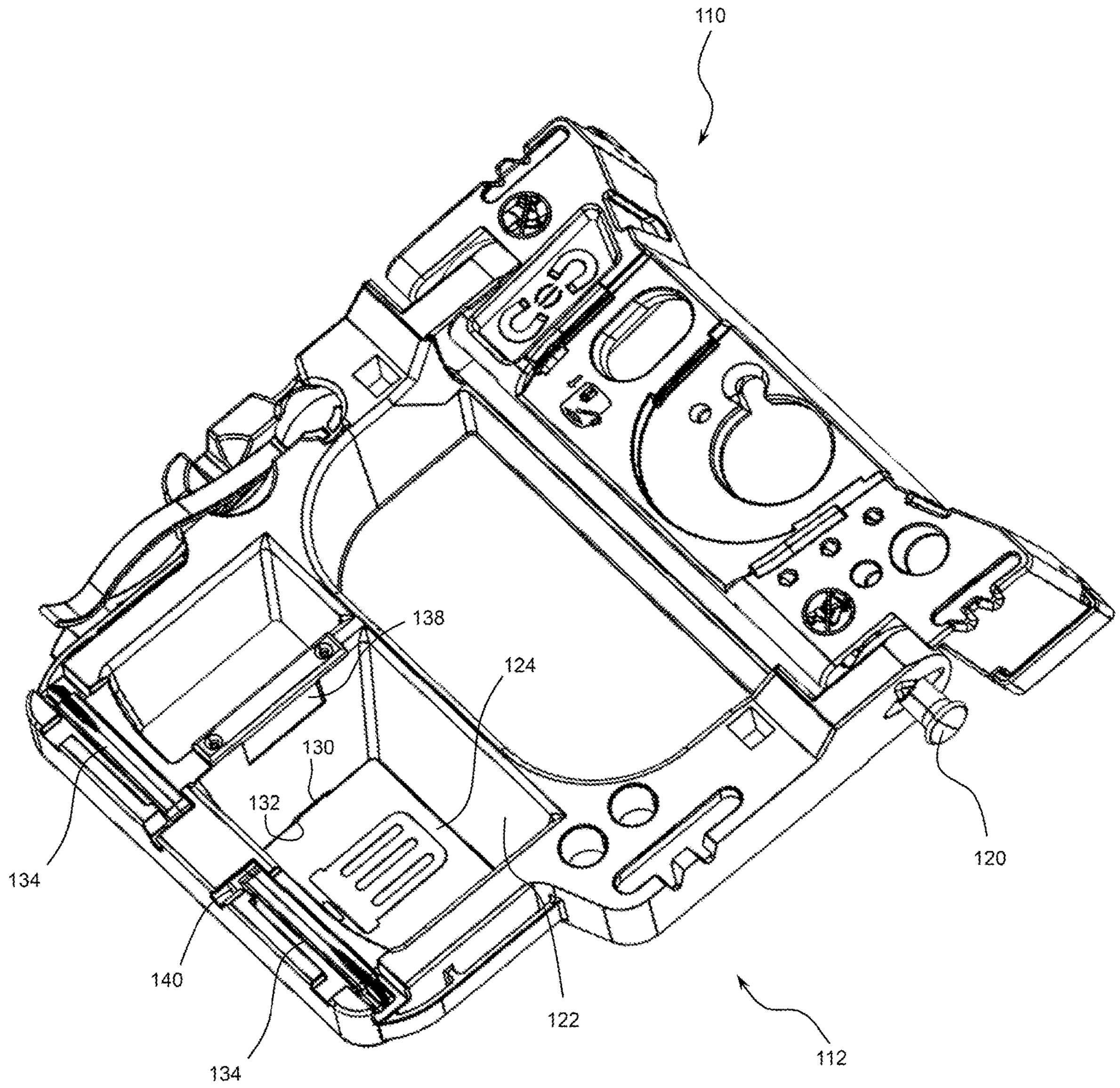
FIG. 11 is an isometric view of the tray and top cap of FIG. 8.
Figure 12:
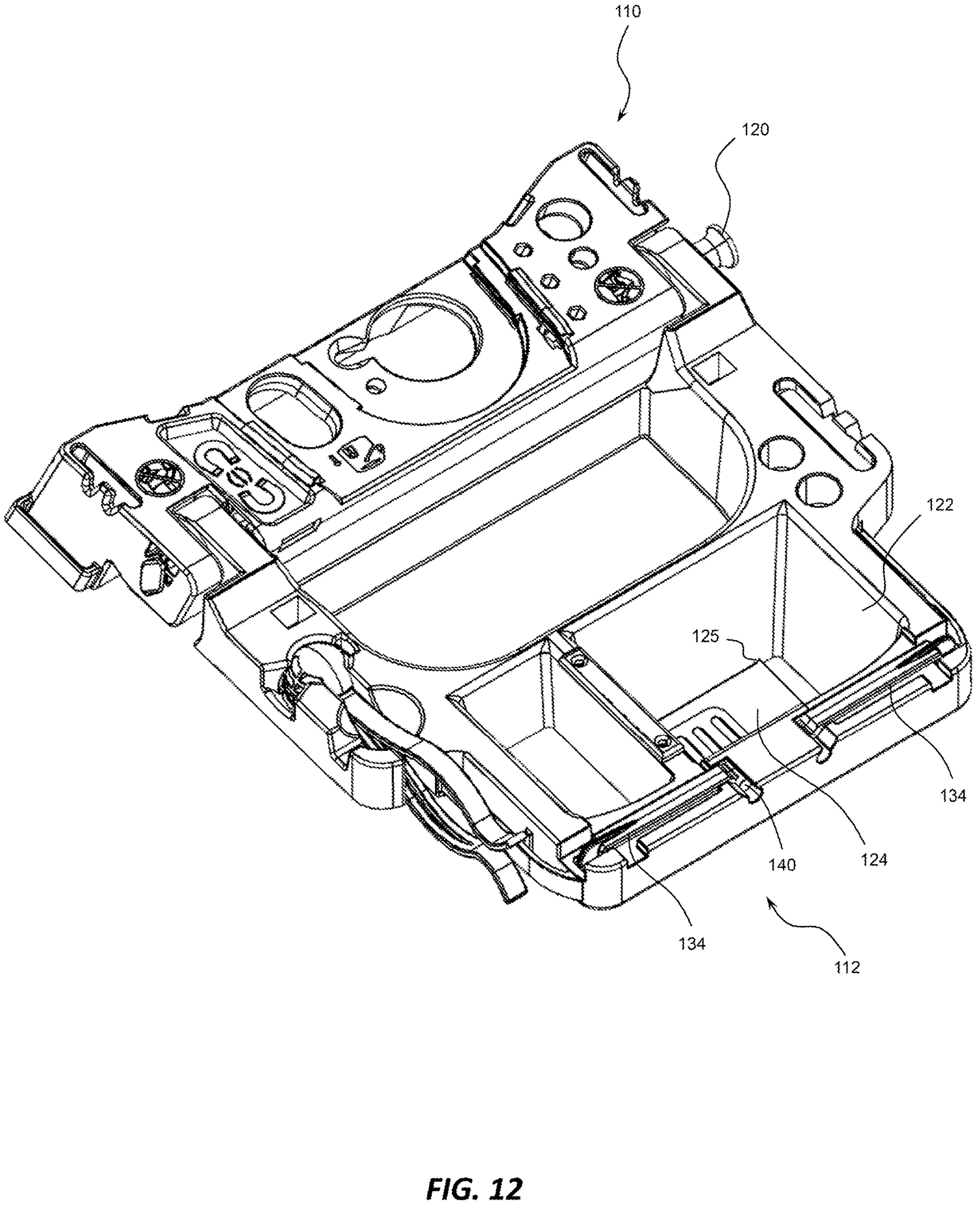
FIG. 12 is an isometric view of the tray and top cap of FIG. 8.
Figure 13:
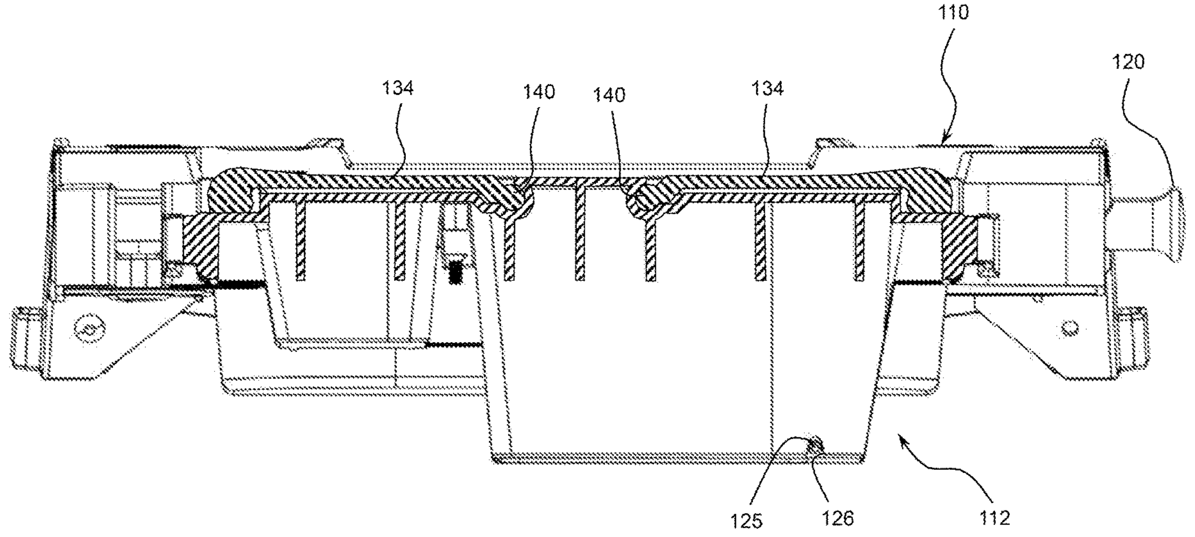
FIG. 13 is a section view of the tray and top cap as taken through section lines 13-13 in FIG. 10.
Figure 14:
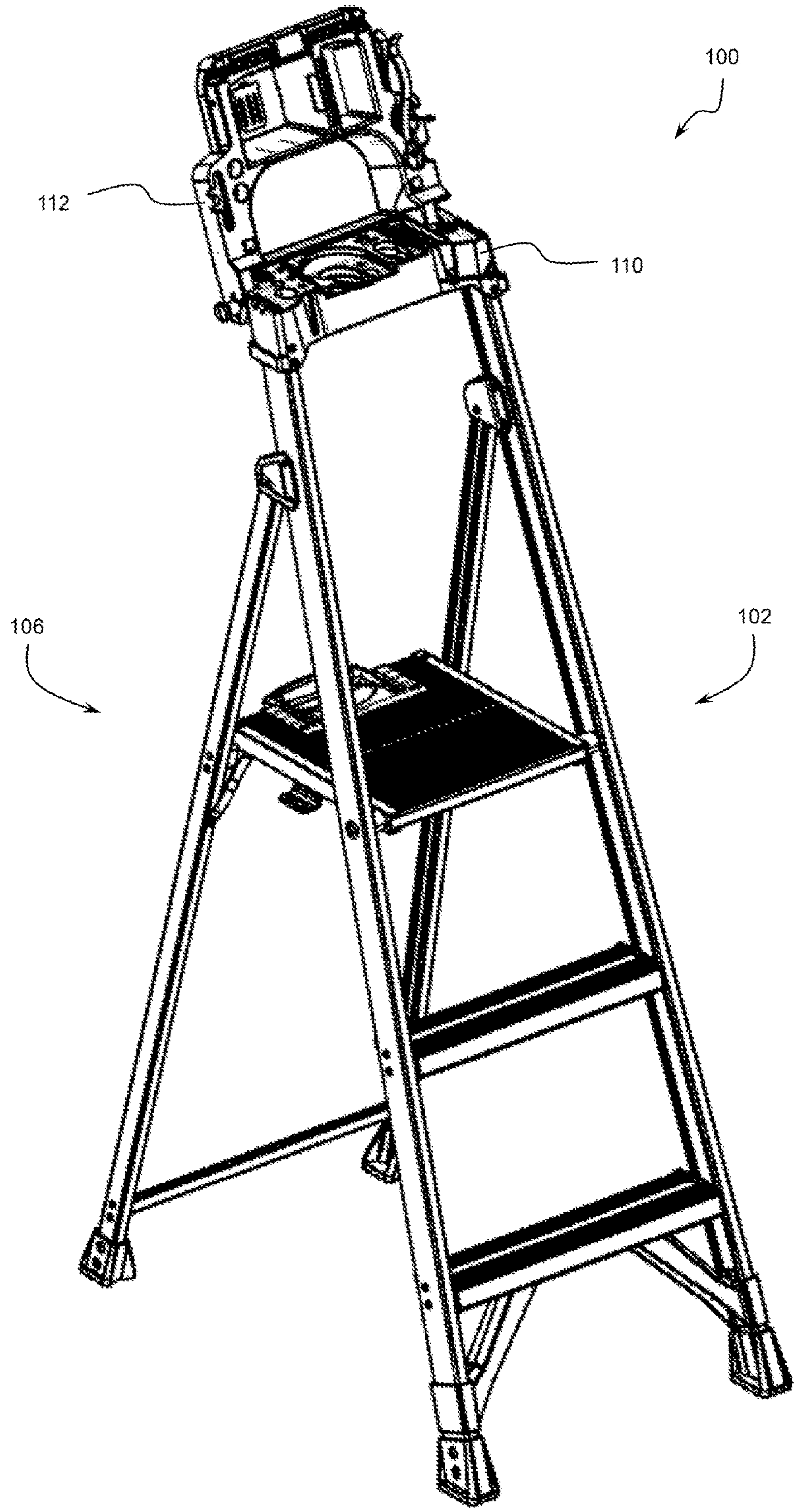
FIG. 14 is a front isometric view of a ladder with a tray in an upright configuration.
Figure 15:
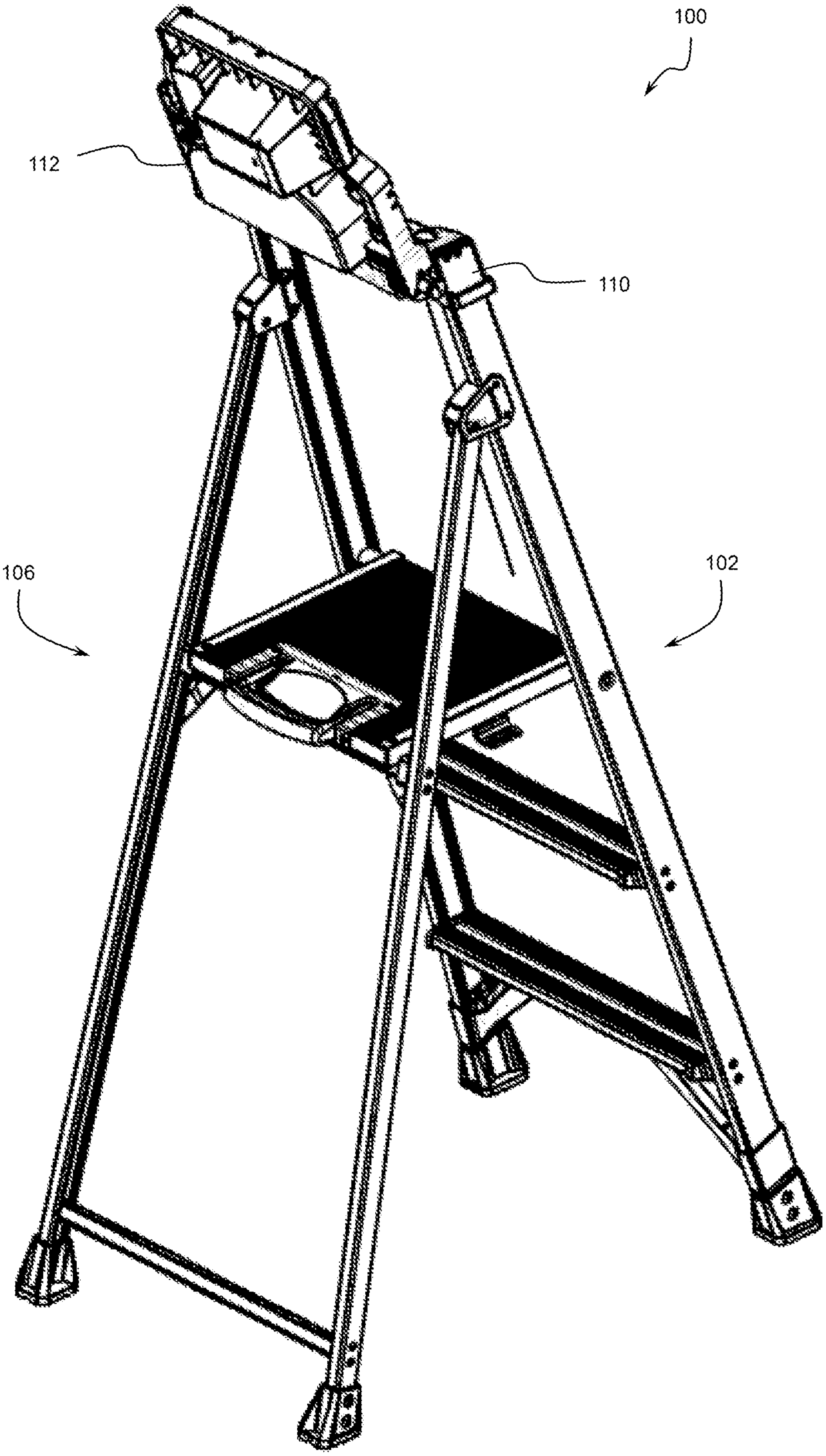
FIG. 15 is a rear isometric view of the ladder of FIG. 14.
Figure 16:
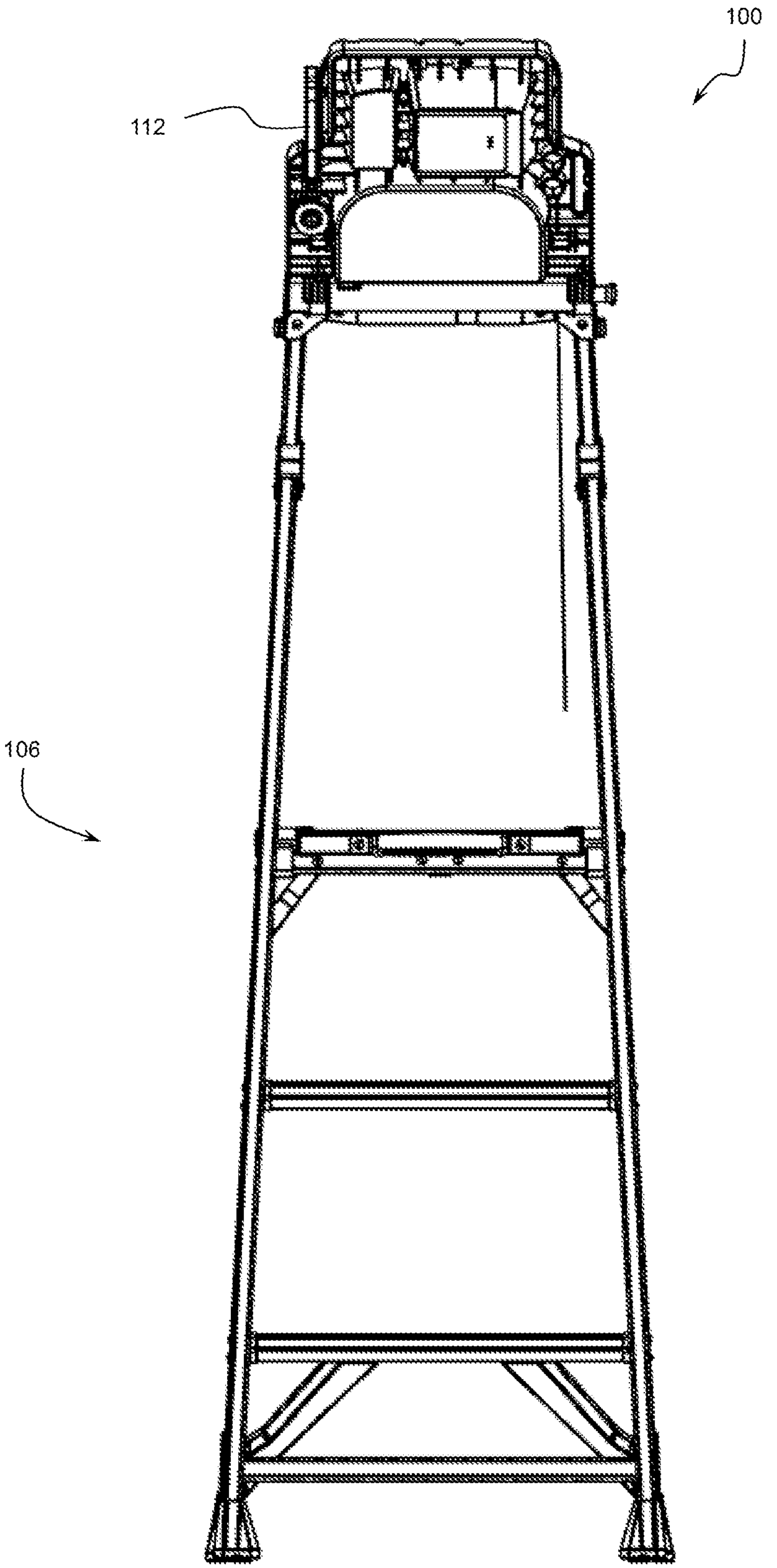
FIG. 16 is a rear view of the ladder of FIG. 14.
Figure 17:
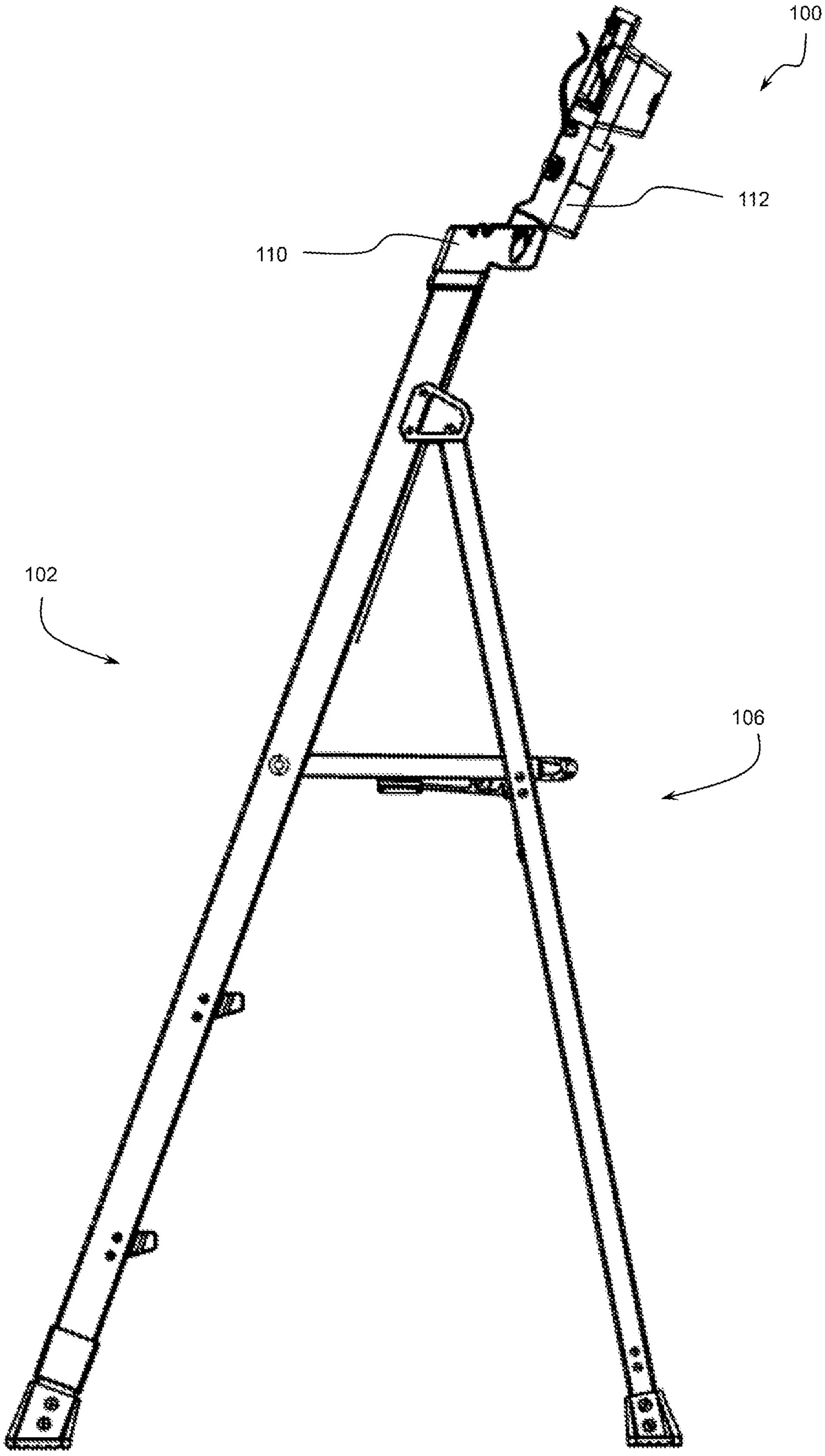
FIG. 17 is a left side view of the ladder of FIG. 14.
Figure 18:
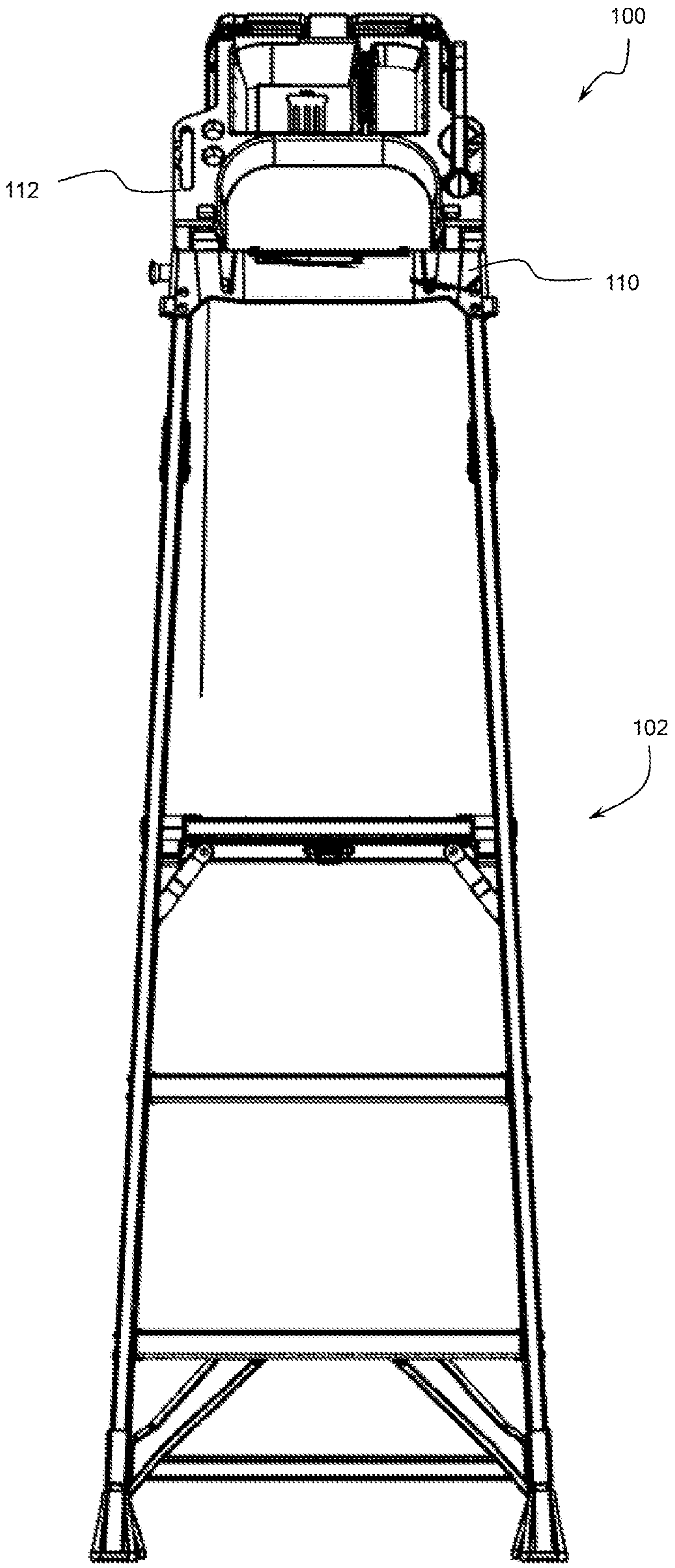
FIG. 18 is a front view of the ladder of FIG. 14.
Figure 19:
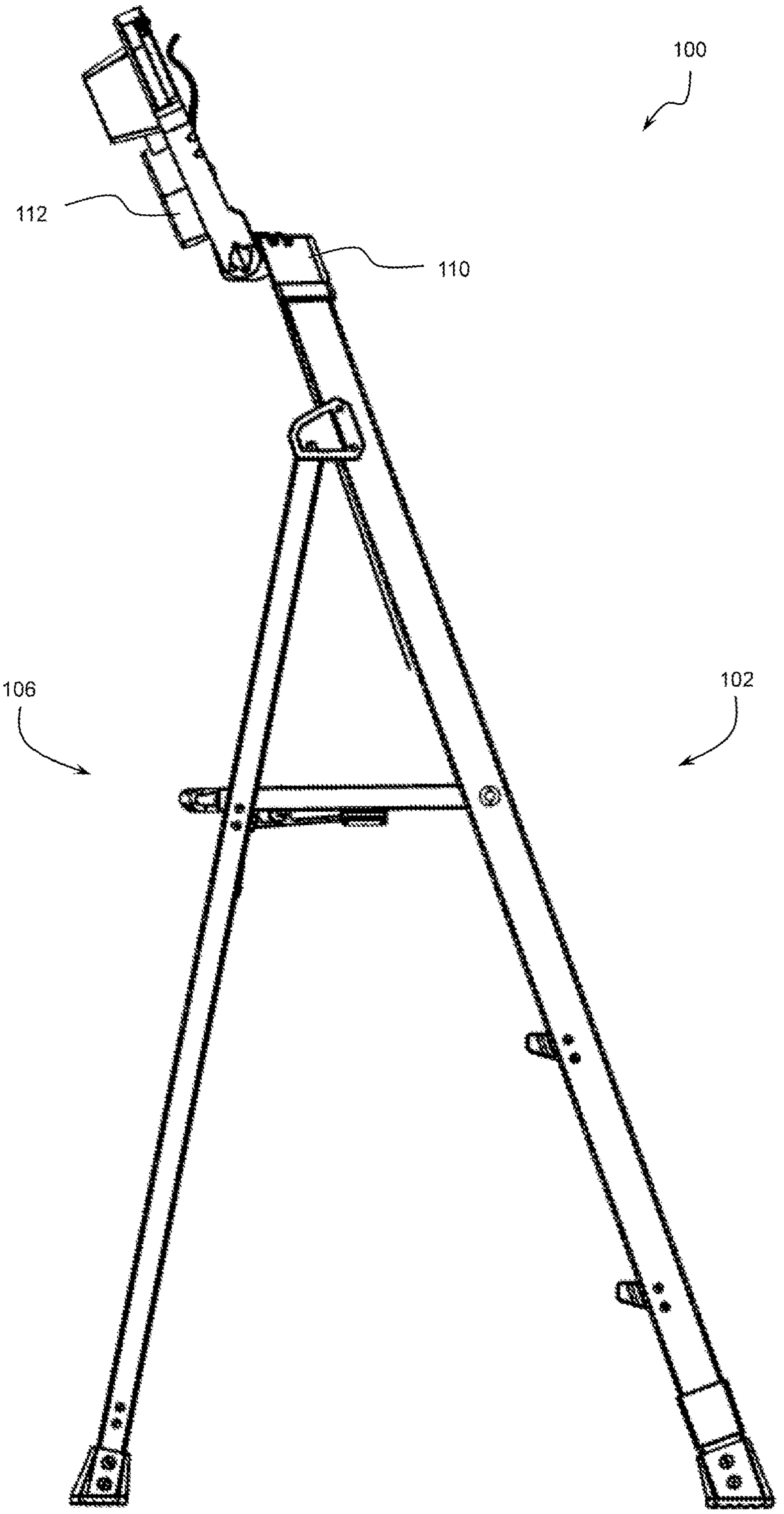
FIG. 19 is a right side view of the ladder of FIG. 14.
Figure 20:
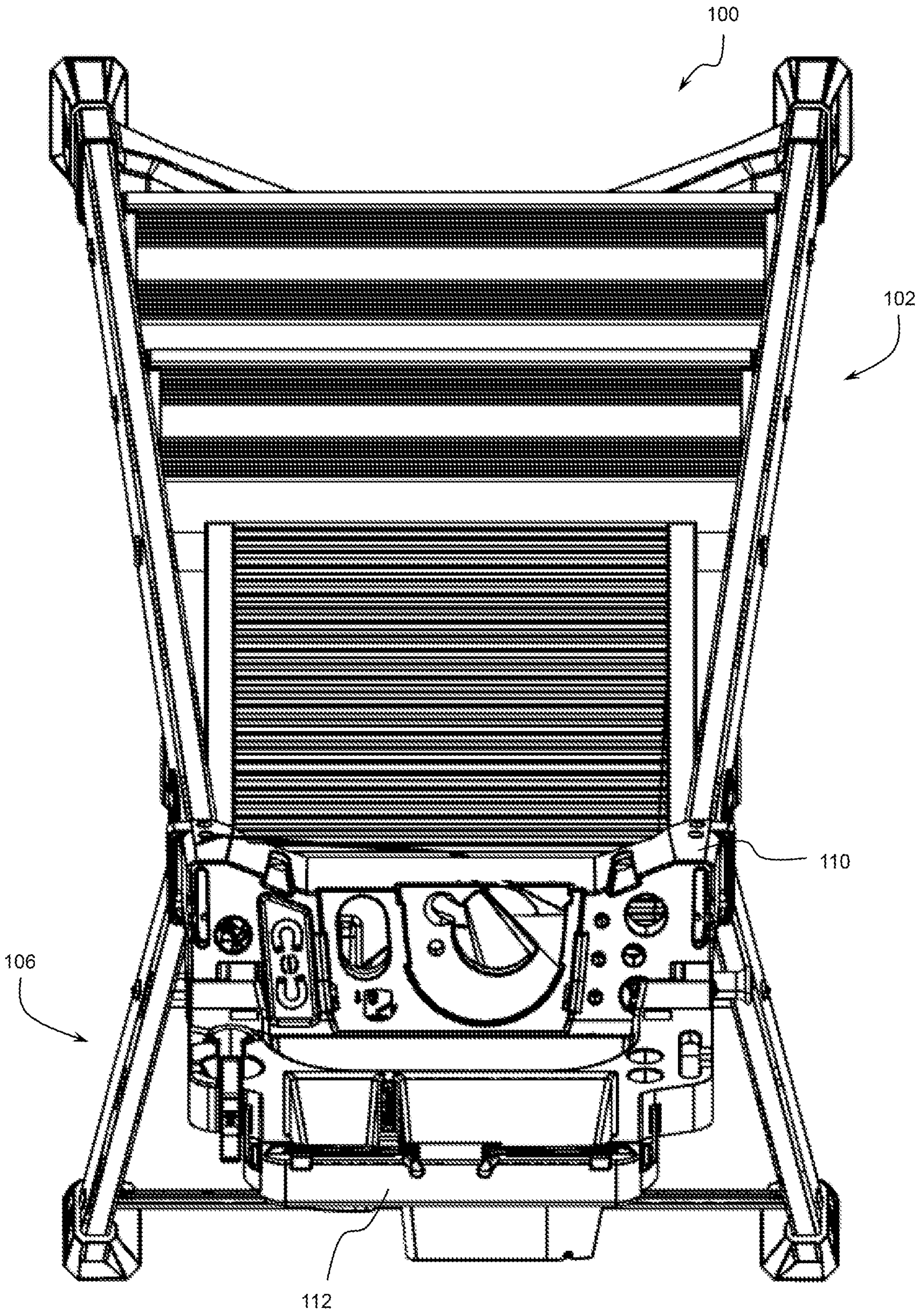
FIG. 20 is a top view of the ladder of FIG. 14.
Figure 21:
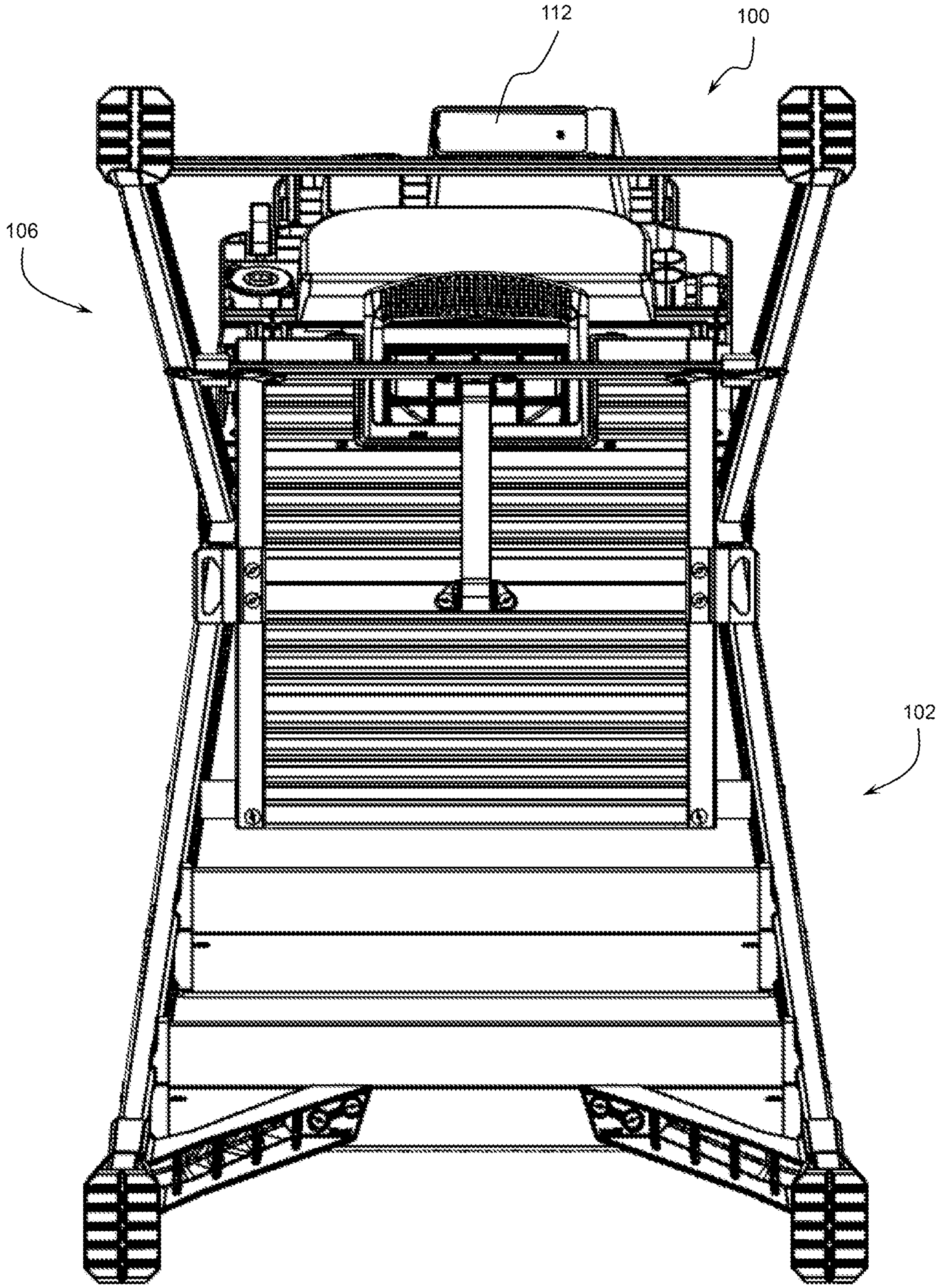
FIG. 21 is a bottom view of the ladder of FIG. 14.
Figure 22:
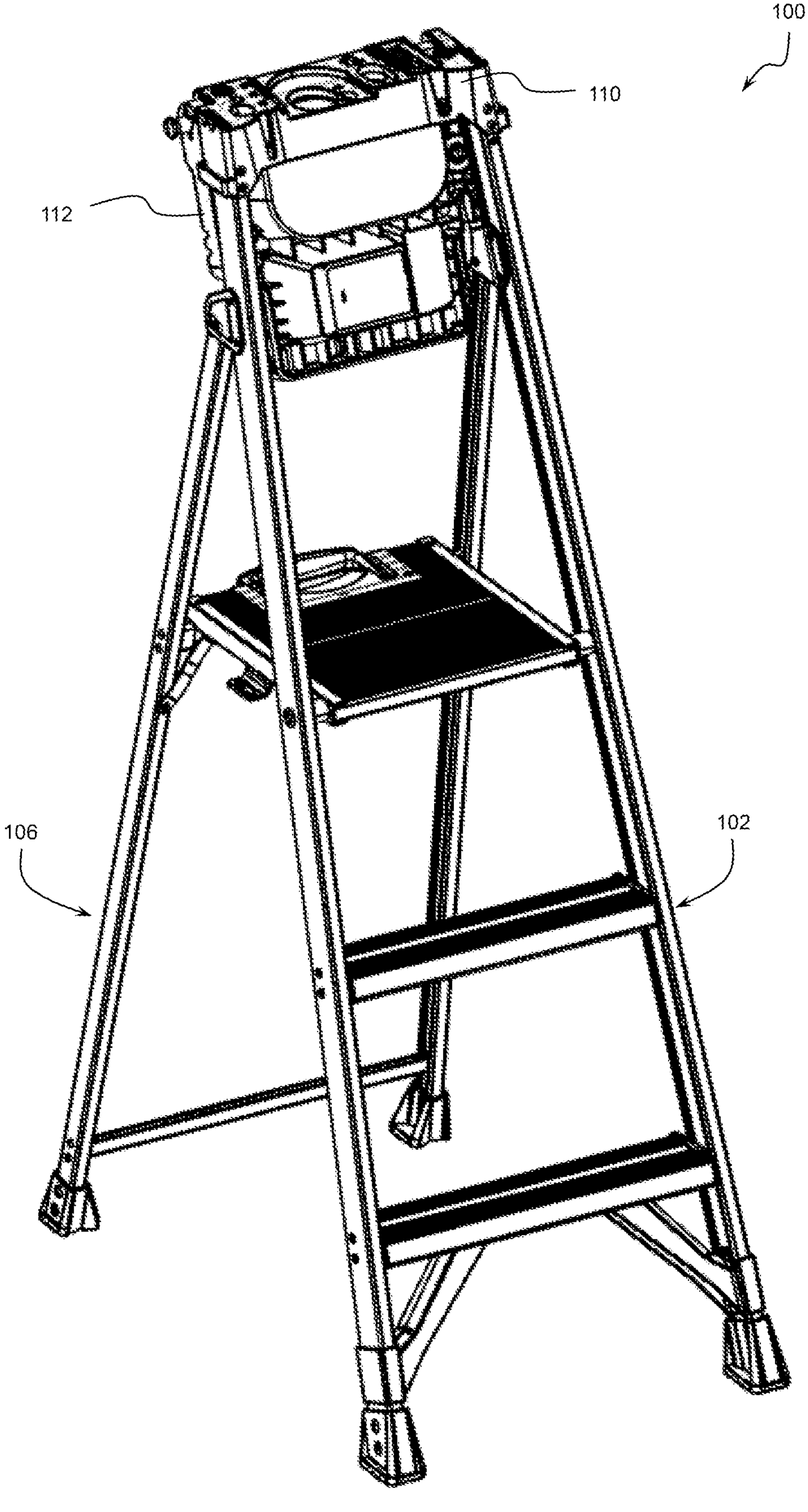
FIG. 22 is a front isometric view of a ladder with a tray in a stored configuration.

Additionally, the clamps 134 may have their pivot ends 140 formed with cylindrical portions configured to slide into position in partially cylindrical channels in the tray 112, as shown in FIGS. 11-13. The diameter of the pivot ends 140 may be substantially similar to the diameter of the channels, and the top openings of the channels may be smaller than that diameter. Thus, the clamps 134 may be simply and easily inserted and installed onto the tray 112 while also being resistant to being vertically pulled out of the channels.

The upright rotated position of the tray 112, as shown in FIGS. 14-21, illustrates that the tray 112 may be used as a handle or grip at the top end of the ladder 100 in addition to the top cap 110 and which extends vertically higher than the top cap 110. The rearward or distal end of the tray 112 may have a thickness configured to be receivable within a hand grip of a typical user. The tray 112 in the upright position may therefore improve user stability and comfort while using the ladder 100.

Figure 23:
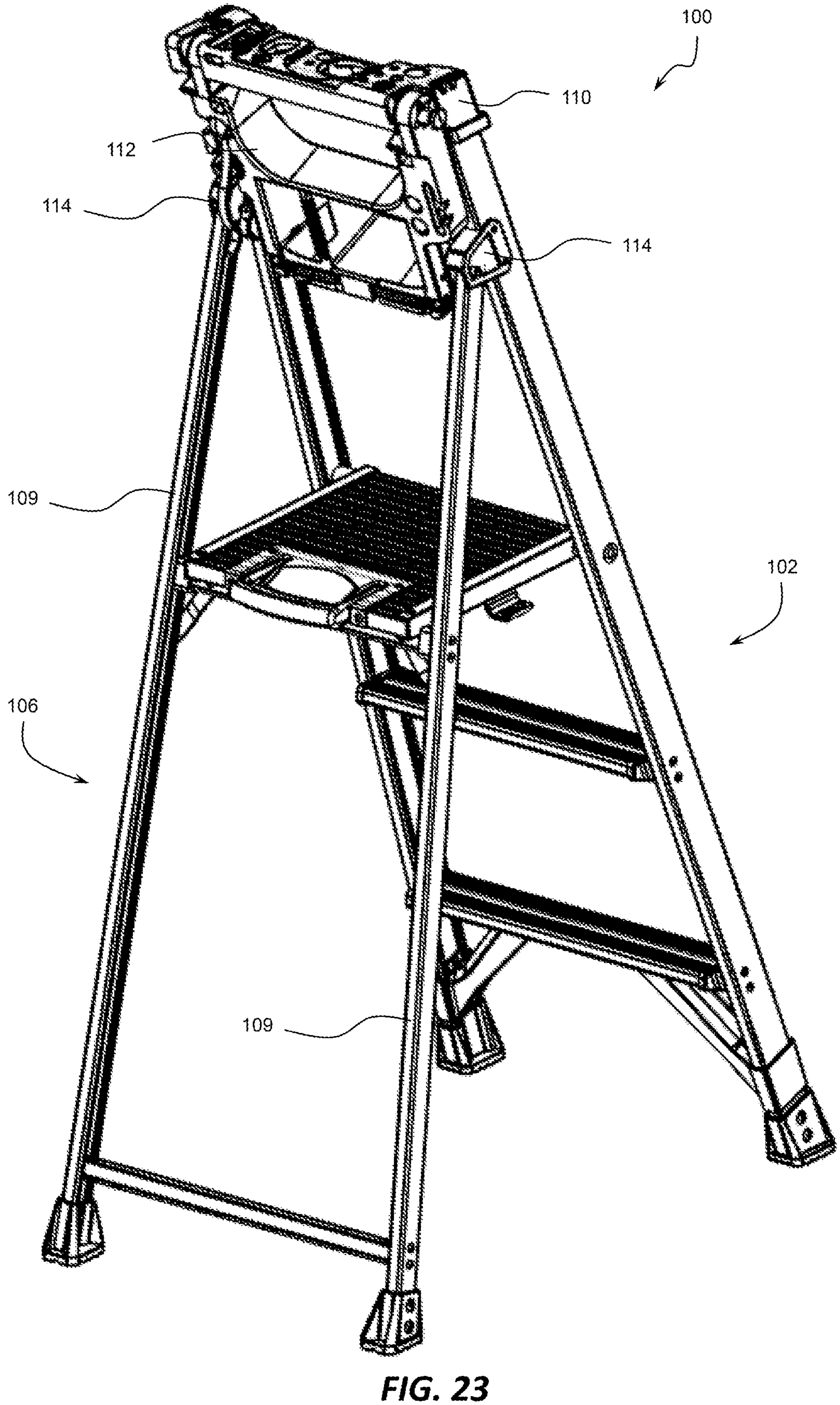
FIG. 23 is a rear isometric view of the ladder of FIG. 22.
Figure 24:
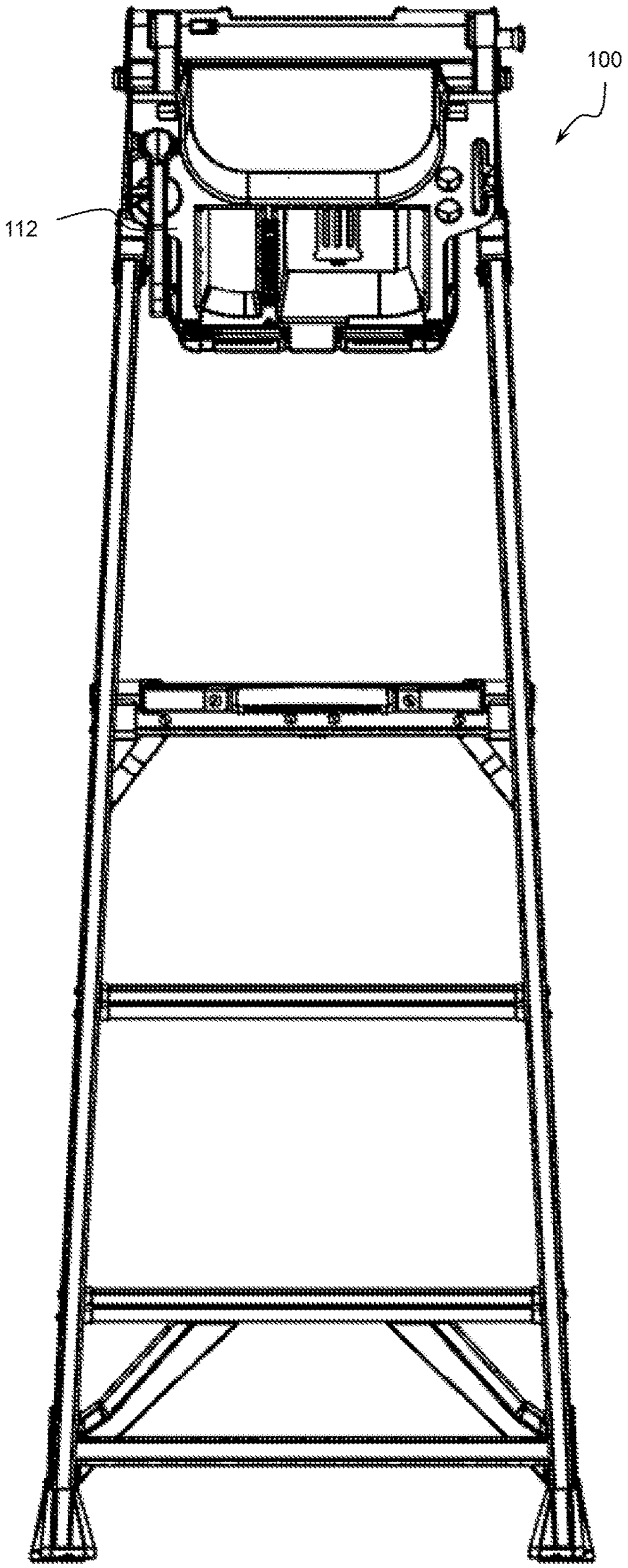
FIG. 24 is a rear view of the ladder of FIG. 22.
Figure 25:
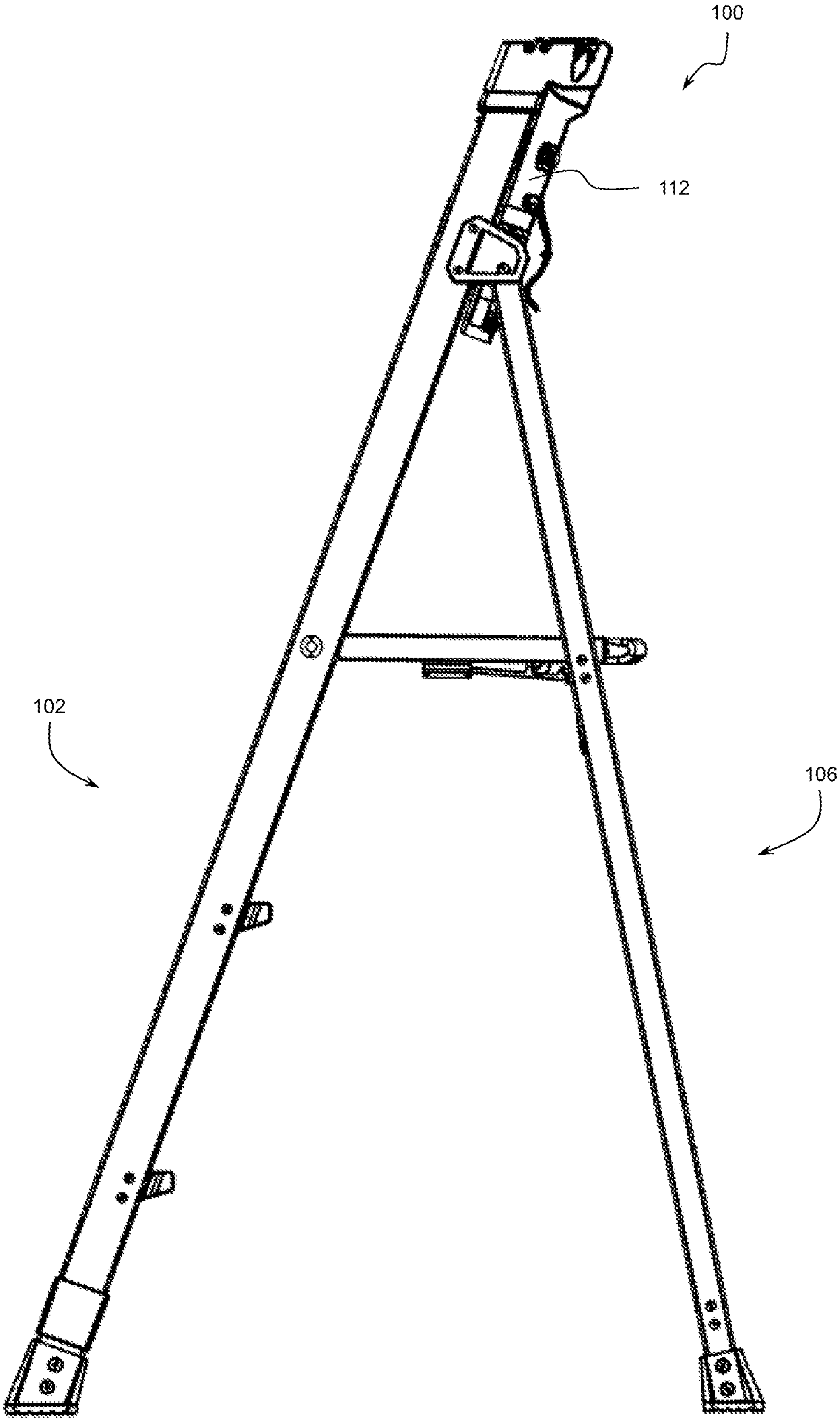
FIG. 25 is a left side view of the ladder of FIG. 22.
Figure 26:
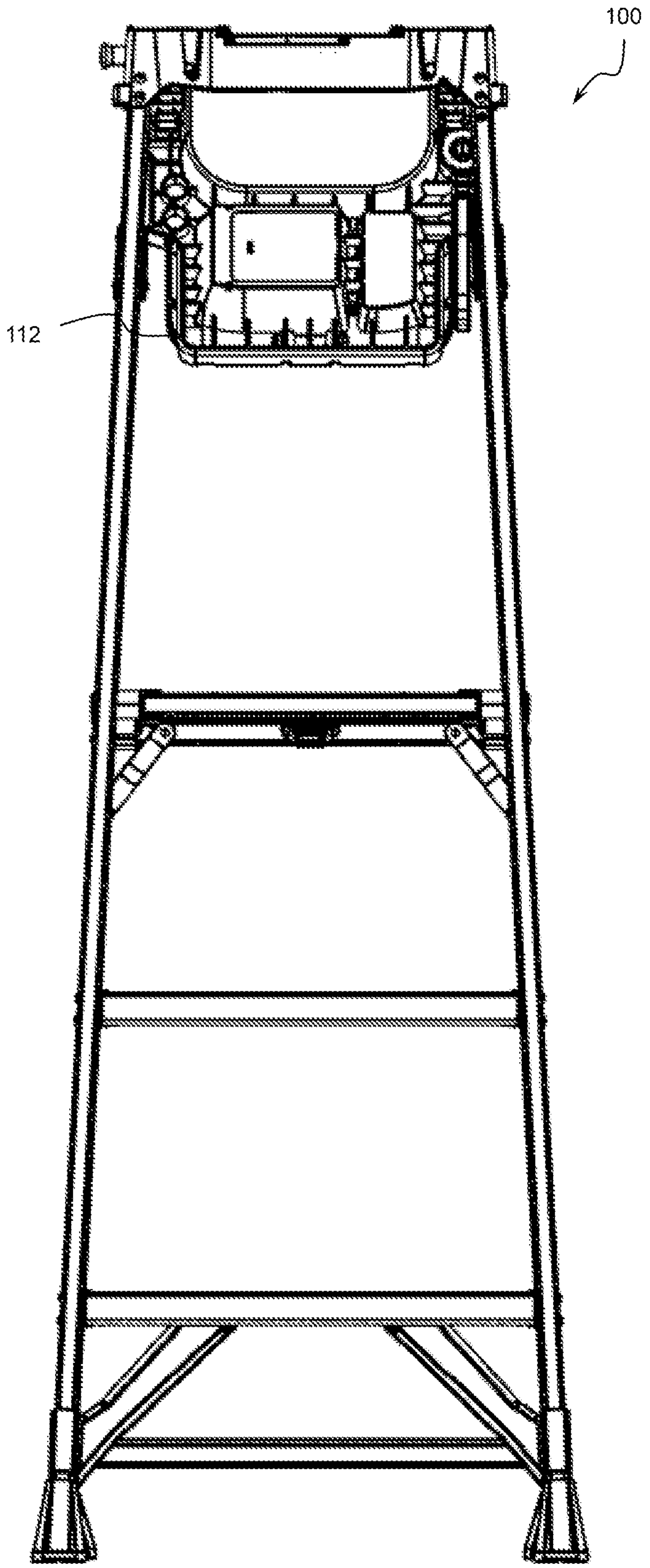
FIG. 26 is a front view of the ladder of FIG. 22.
Figure 27:
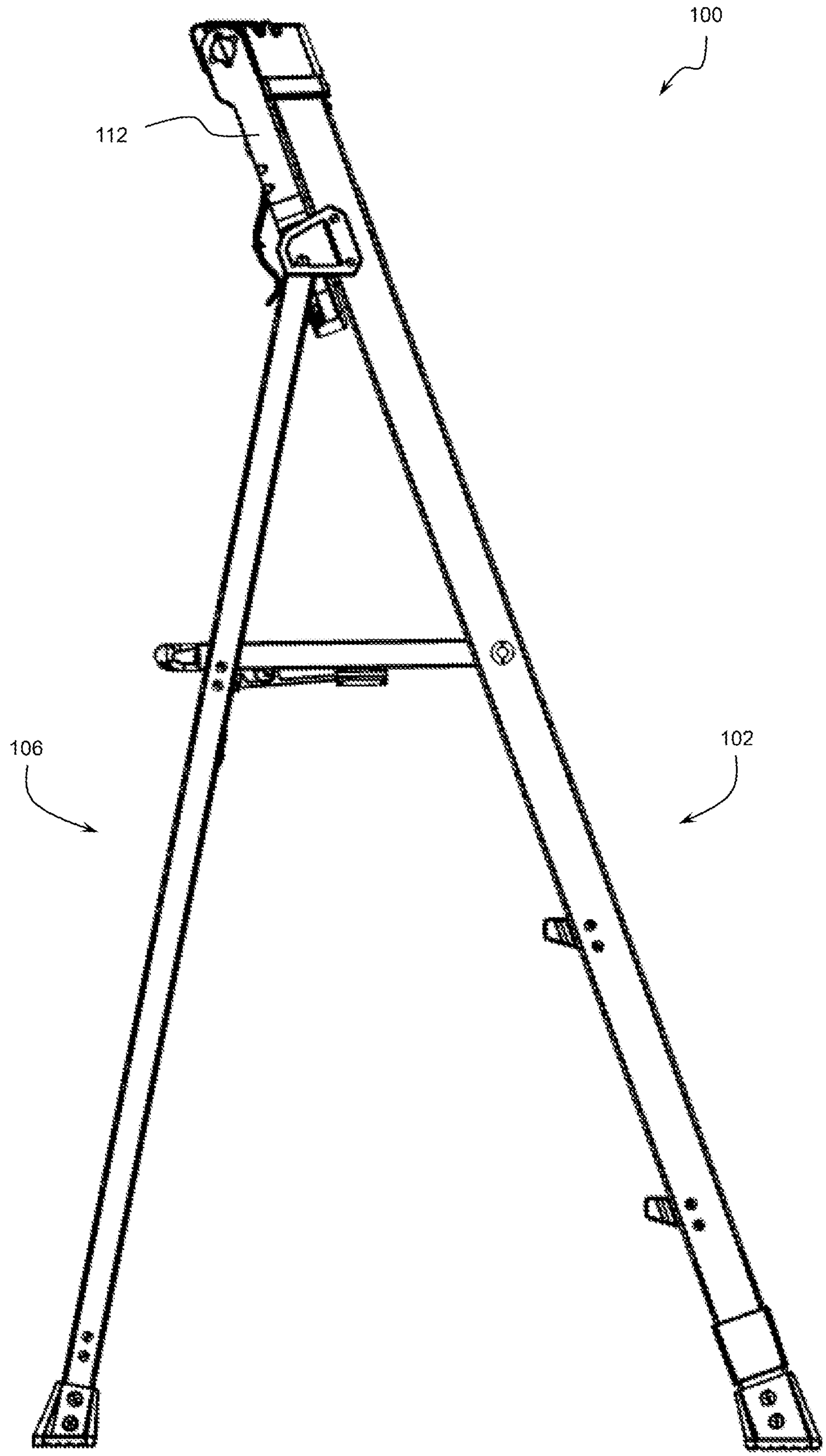
FIG. 27 is a right side view of the ladder of FIG. 22.
Figure 28:
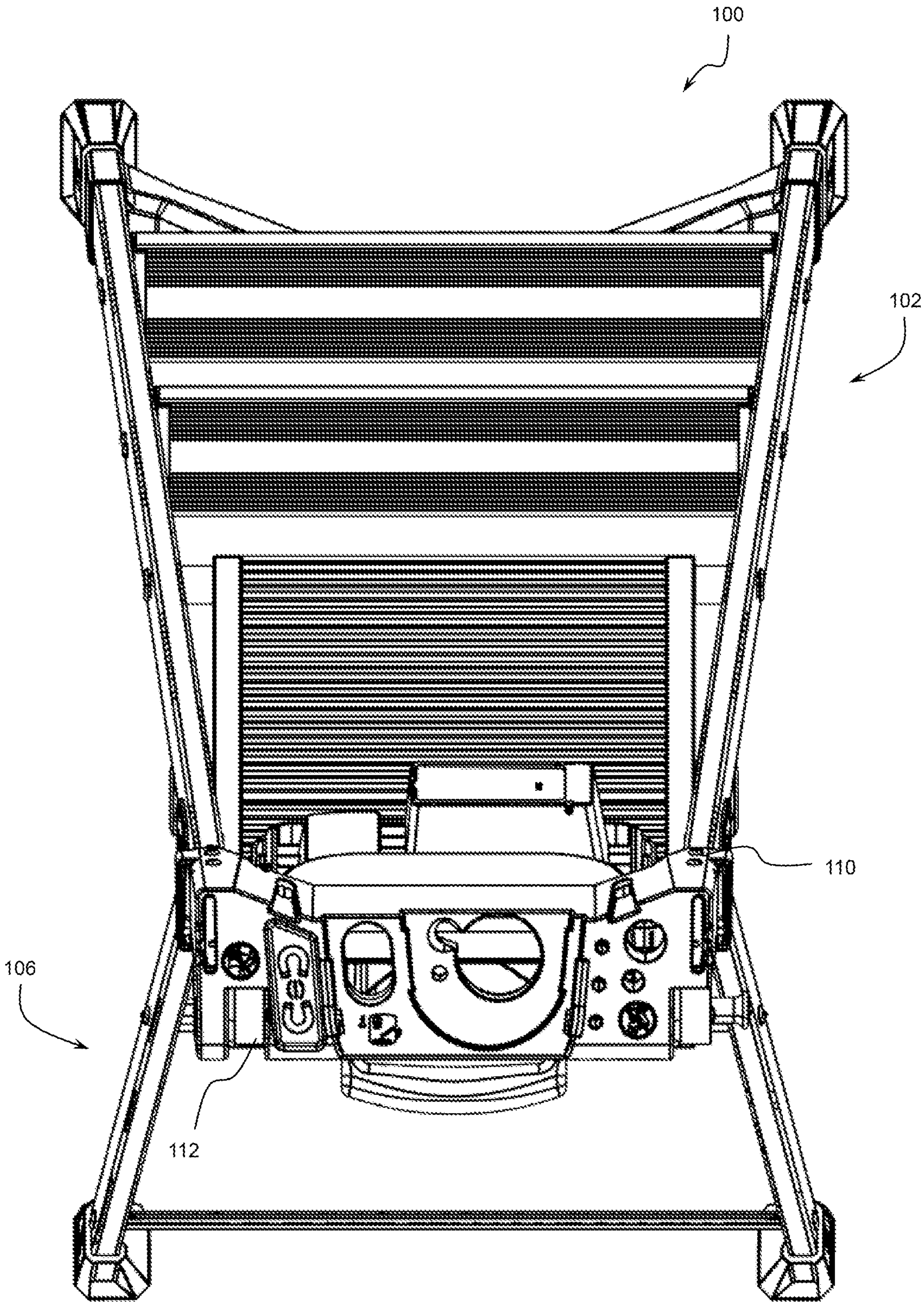
FIG. 28 is a top view of the ladder of FIG. 22.
Figure 29:
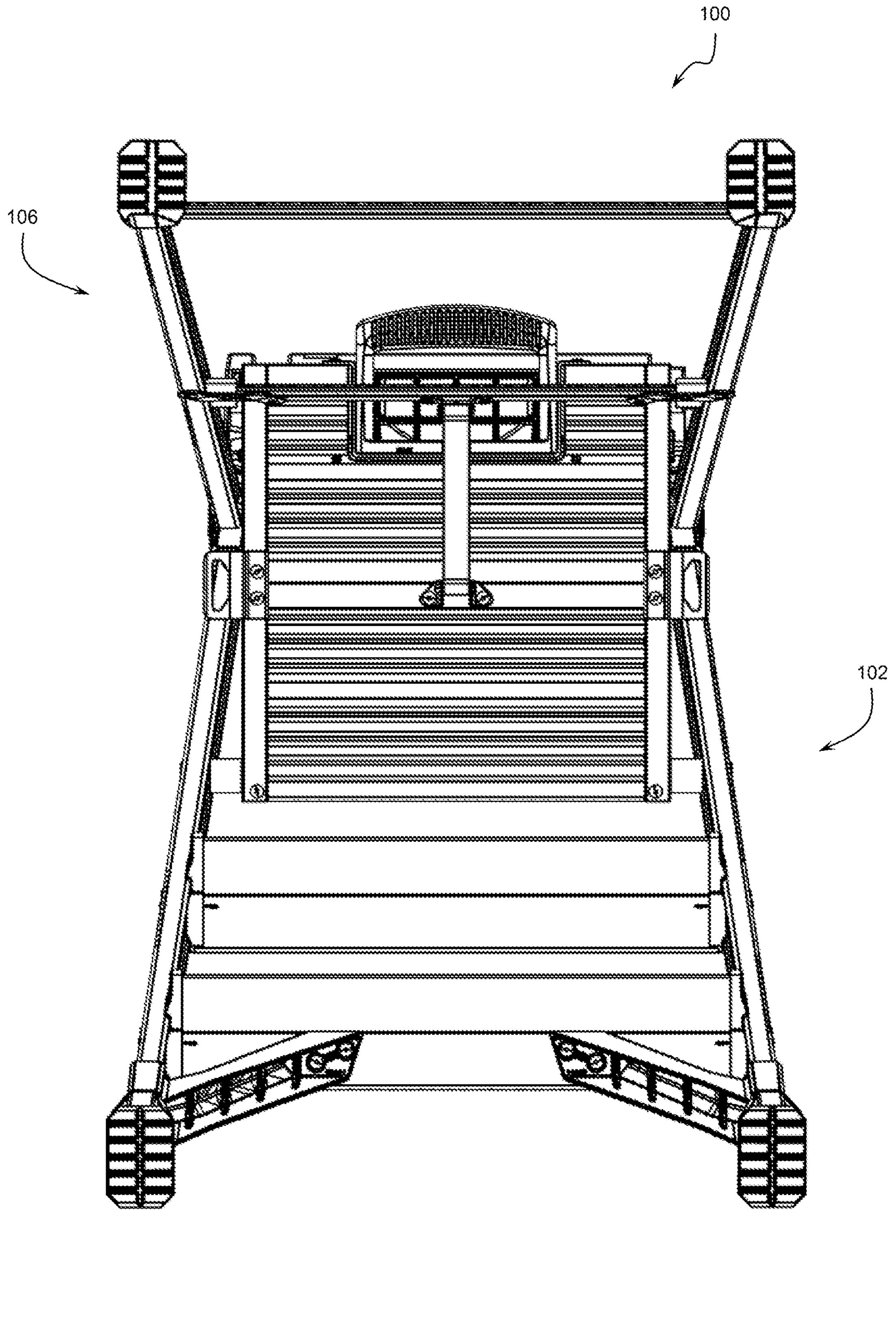
FIG. 29 is a bottom view of the ladder of FIG. 22.

The downward rotated position of the tray 112, as shown in FIGS. 22-29, may reduce the overall outer dimensions of the ladder 100, thereby improving portability and reducing packaging and shipping size envelopes of the ladder 100. As shown in FIG. 23, the tray 112 may have a first width substantially similar to the width of the top cap 110 and a second, more distal width that is narrower than the first width. The second width may enable the tray 112 to fold down between the rear rails 109 and between the hinges 114. Accordingly, the narrower second width of the tray 112 may enable the tray 112 to have a greater length than just the distance between the top cap 110 and the hinges 114.

FIGS. 30-33 show example features in connection with another embodiment of a top cap 3010 and tray 3012 for a ladder 3000. Various combinations of features and elements of top cap 110 and tray 112 described above may also be implemented in top cap 3010 and tray 3012 as well, as shown in FIGS. 30-33. Similarly, features and elements of ladder 3000 can be implemented in ladder 100.

The top cap 3010 may include a pair of clamps 3034 on an opposite side of the top cap 3010 relative to the tray 3012, i.e., on a user-facing side of the top cap or opposite the hinge(s) (e.g., at adjustment member 3020) coupling the tray 3012 and top cap 3010. The clamps 3034 can operate similar to clamps 134, as described elsewhere herein. Furthermore, the positioning of the clamps 3034 can allow the user to attach a paint tray or similar object on the user-facing side of the top cap 3010, which can be useful to improve accessibility due to being nearer to the intended position of the user. Additionally, the clamps 3034 can be used to attach an object to the top cap 3010 while the tray 3012 is rotated to a downward/collapsed/storage position (e.g., similar to the position of FIG. 27).

Clamps 134 may be configured to rotate upward/away from a top plane of the tray 112, and clamps 3034 may be configured to rotate forward/away from a front plane of the top cap 3010. The axes of rotation (i.e., pivot axes) of clamps 3034 may be substantially vertical or parallel to the front face of the top cap 3010. Clamps 134 may support and clamp against object positioned vertically between the tray-facing inner surface of the clamp 134 and a clamp-facing surface of the tray 112. Likewise, the clamps 3034 may support and clamp against objects positioned horizontally between the top-cap-facing inner surface of the clamp 3034 and a surface of the top cap 3010 facing the clamp 3034. Thus, clamps 3034 can help support thin objects that are vertically oriented (i.e., they are elongated in an up/down direction and flattened in a horizontal direction), and clamps 134 can support thin objects that are horizontally oriented (i.e., they are elongated in a front/back direction and flattened in a vertical direction). Additionally, clamps 3034 can resist horizontal movement of an object being held by the clamps 3034 against the top cap 3010. This can be beneficial, as compared to resisting vertical movement (as in the case of clamps 134), because the weight of an object held by the clamps 3034 can rest downward against the top cap 3010 and can pull upward against the top cap 3010 (e.g., if inserted into grooves or openings in the front face of the top cap 3052 where the clamps 3034 are located) rather than pressing or pulling on the clamps 3034, which could lead to unintentional detachment or unlocking of the clamps 3034.

Figure 10:
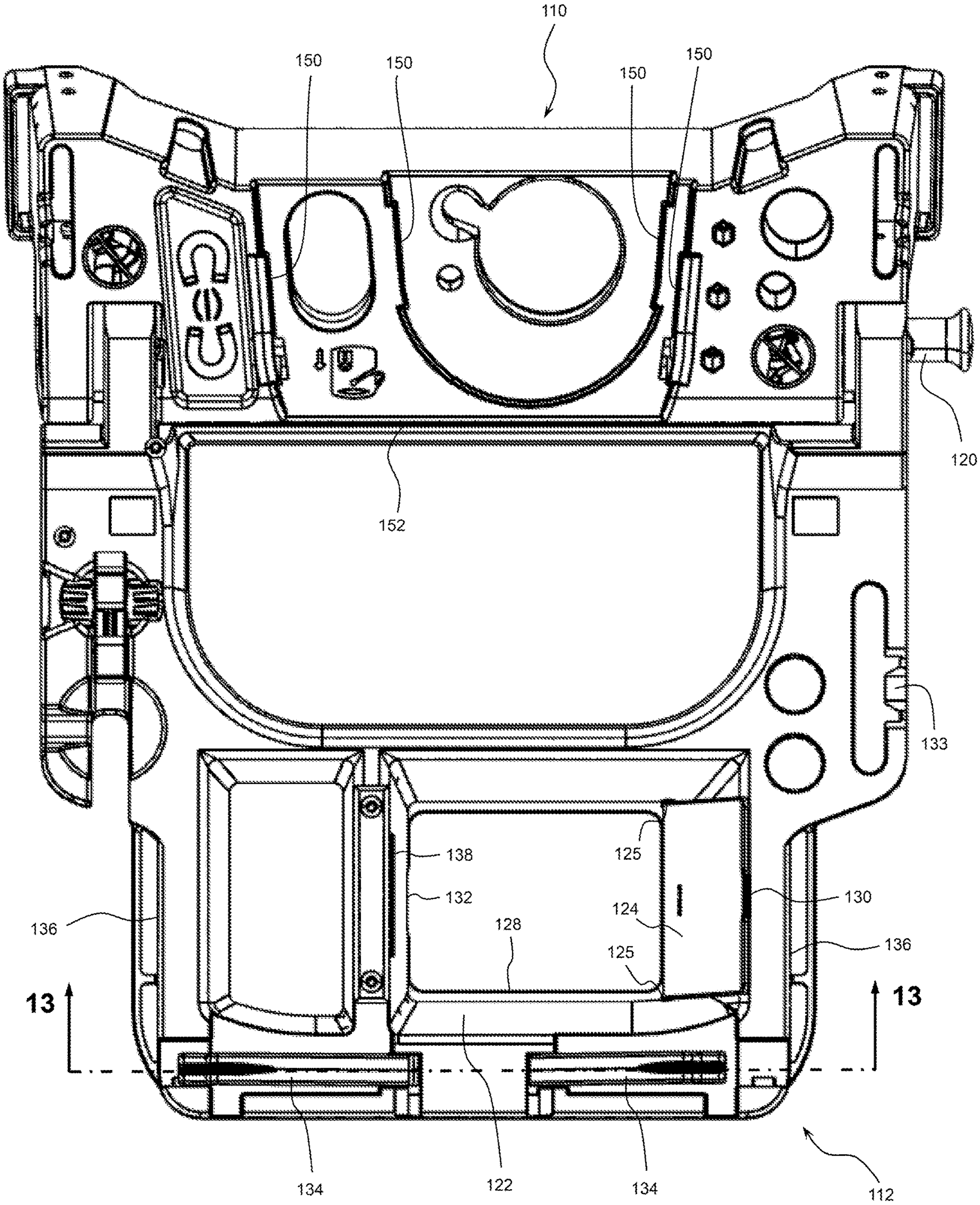
FIG. 10 is a top view of the tray and top cap of FIG. 8.
Figure 30:
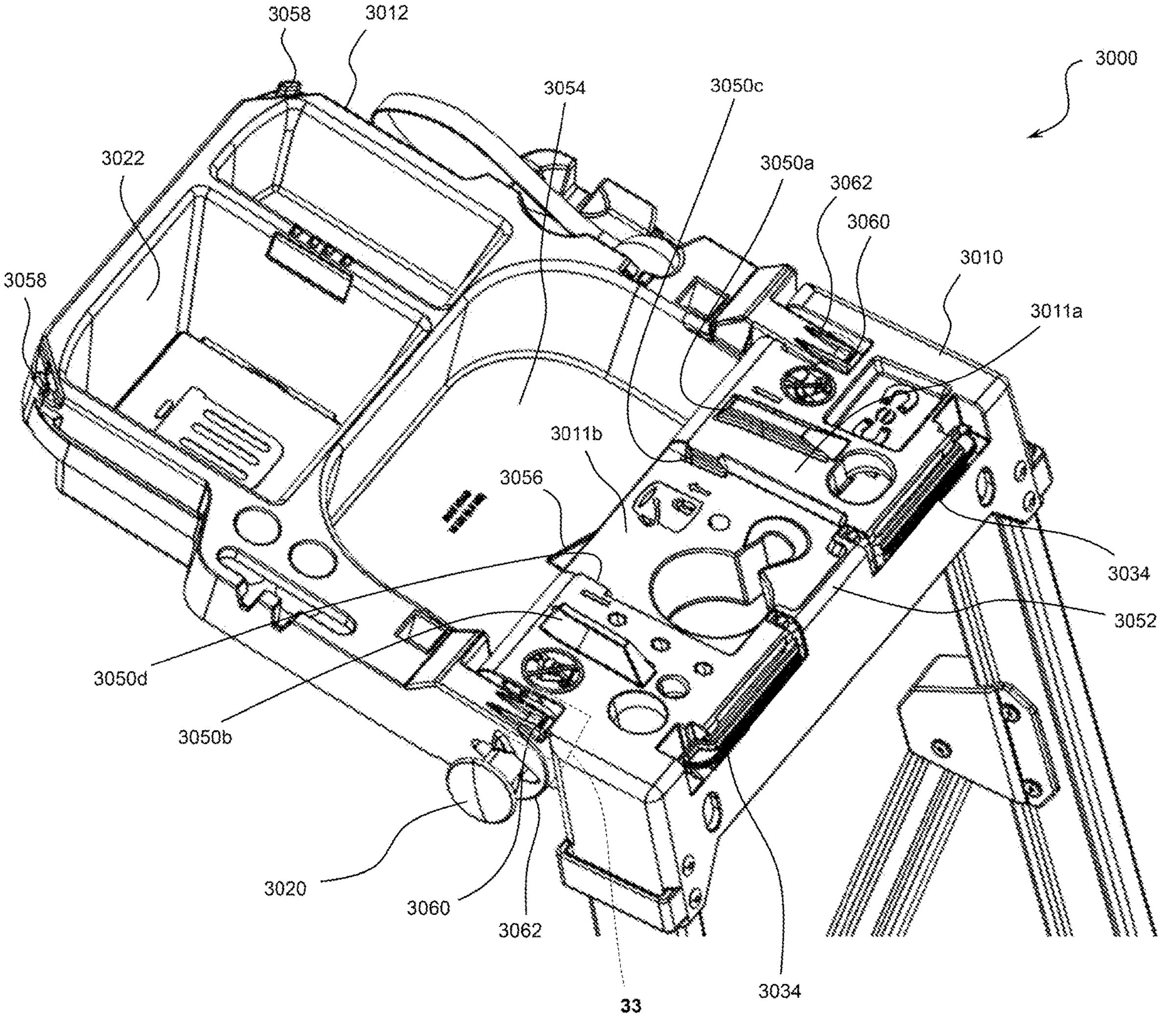
FIG. 30 is an isometric view of a top end of a ladder having a tray in a horizontal configuration.
Figure 31:
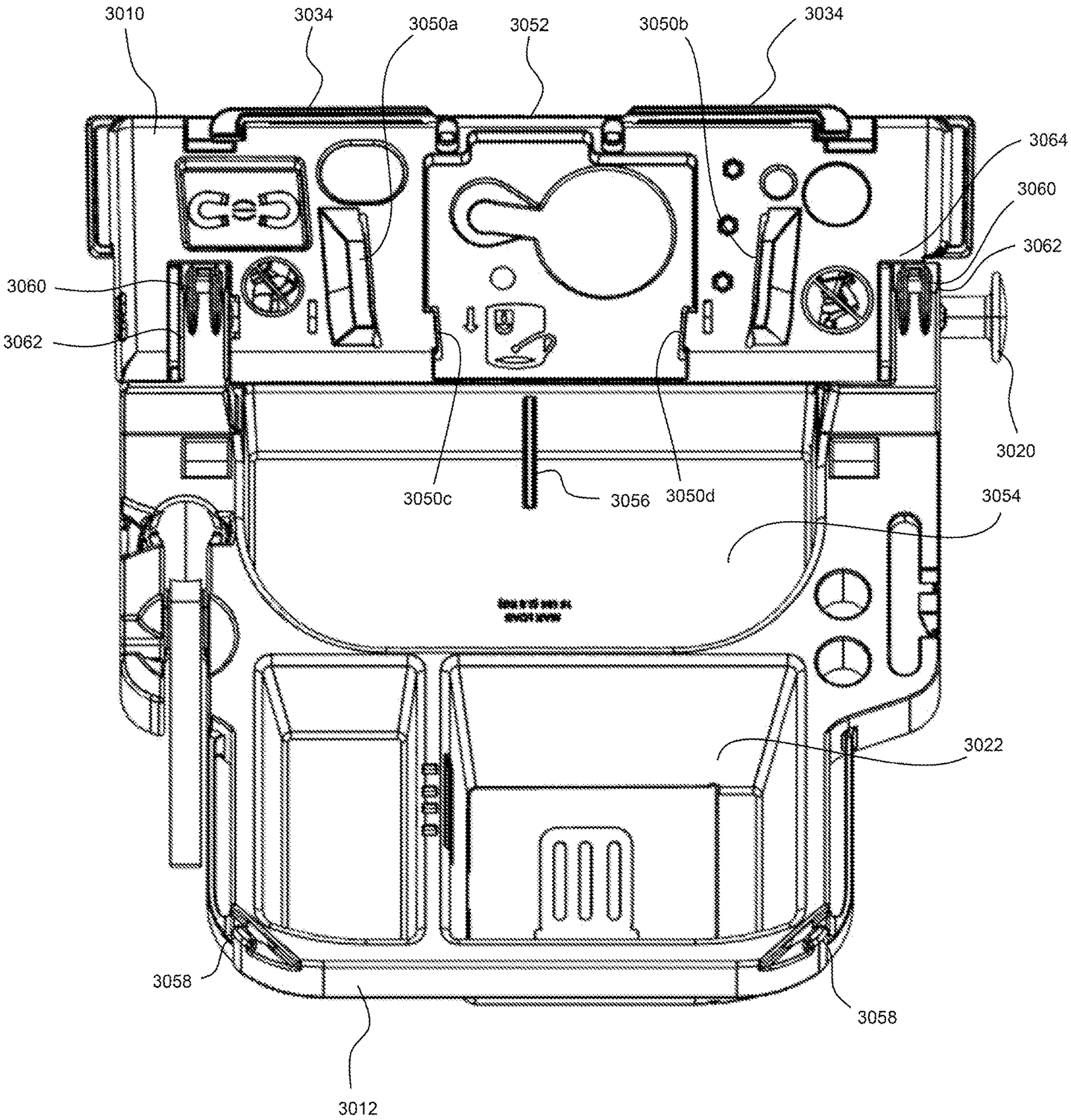
FIG. 31 is a top view of the top cap and tray of the ladder of FIG. 30.
Figure 32:
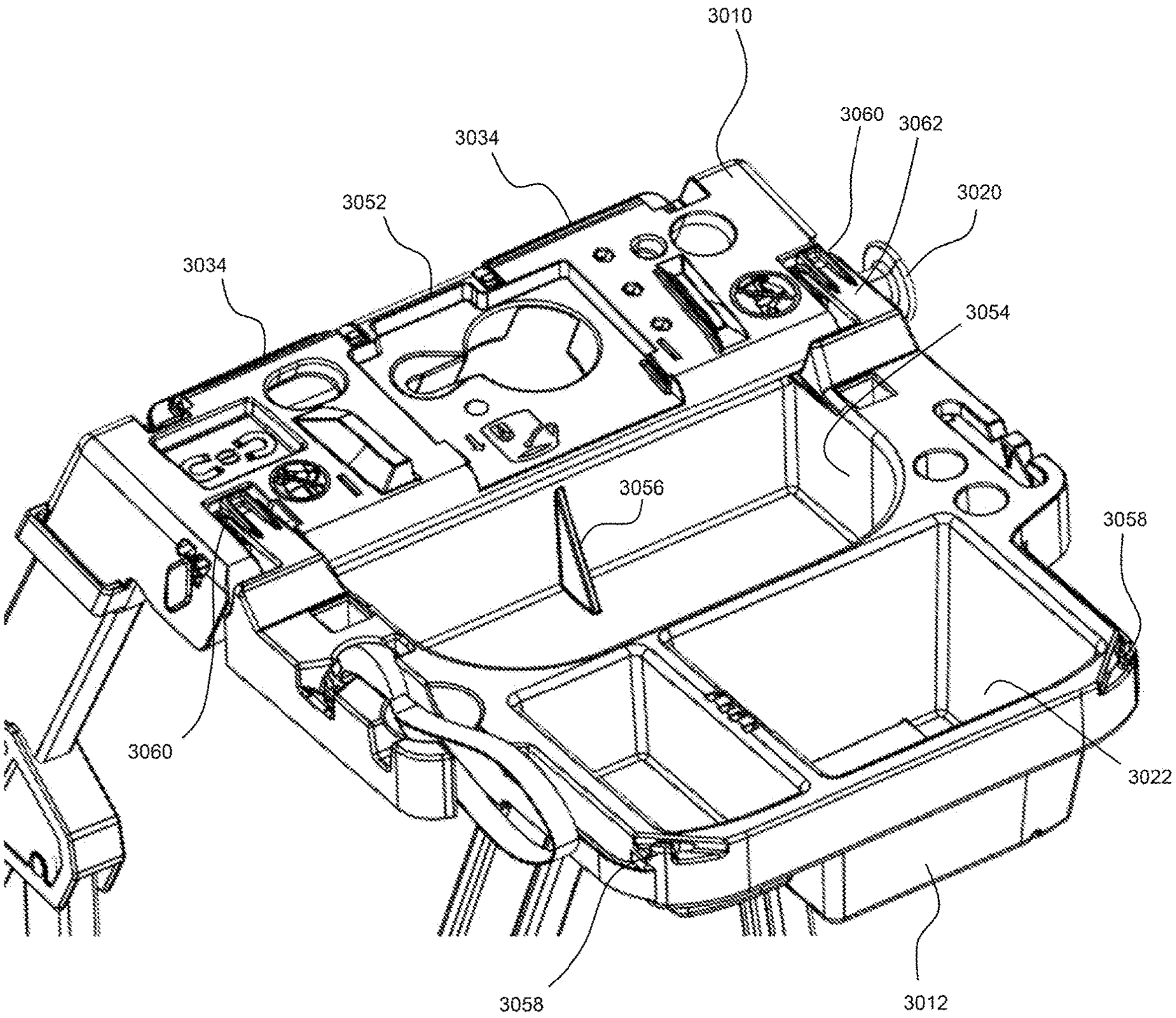
FIG. 32 is an isometric view of the top end of the ladder of FIG. 30.
Figure 33:
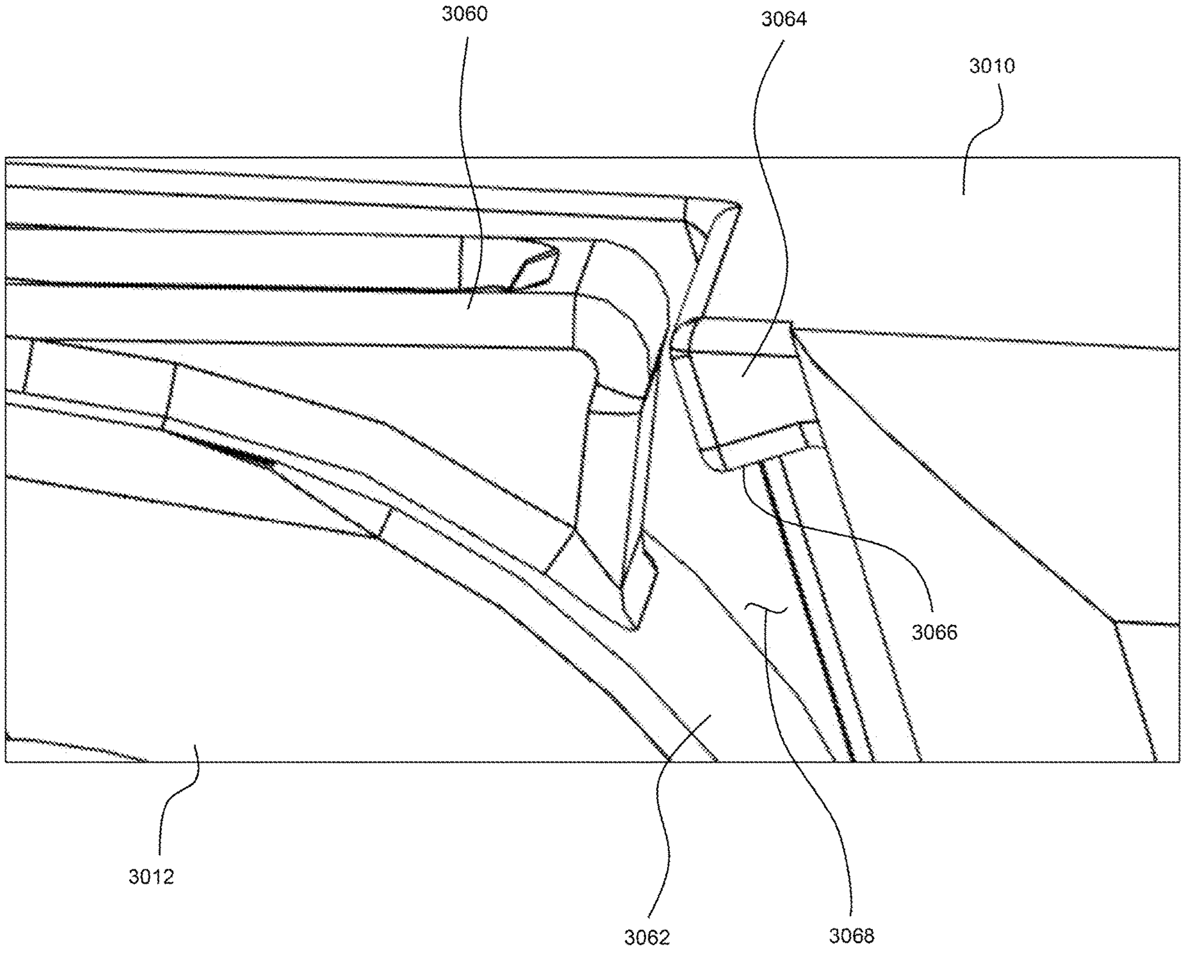
FIG. 33 is a detail isometric view of a hinge area (indicated by area 33 in FIG. 30) of the tray and top cap of the ladder of FIG. 30.

In some embodiments, the top cap 3010 may include a set of retaining surfaces 3050*a-d*. The retaining surfaces 3050*a-d* can be formed on a set of corresponding protrusions extending upwardly (in the case of surfaces 3050*a-b*) or laterally (in the case of surfaces 3050*c-d*) from the top cap 3010. A pair of upper retaining surfaces 3050*a-b* can have a tapering distance between each other. In other words, the pair of upper retaining surfaces 3050*a-b* can taper toward each other along their horizontal lengths. Likewise, the pair of lower retaining surfaces 3050*c-d* can have a tapering distance separating each other, albeit a smaller distance than the upper retaining surfaces 3050*a-b*. The tapering distances in each case allow a user to horizontally slide and insert a cup, bucket, or other removable receptacle between one of the pairs of retaining surfaces 3050*a-b* or 3050*c-d* to couple the receptacle to the top cap 3010. Each pair of retaining surfaces 3050*a-b* or 3050*c-d* can be configured to retain a roughly predetermined size of receptacle, such as the upper surfaces being sized to retain a gallon-sized paint can and the lower surfaces being sized to retain a quart-sized paint can. Similar retaining surfaces 150 with these features are indicated in FIG. 10. As shown in FIG. 30, the primary top surface 3011*a* of the top cap 3010 can have the upper/broader retaining surfaces 3050*a-b* defined on protrusions extending vertically upward from the primary top surface 3011*a*, and the lower/narrower retaining surfaces 3050*c-d* positioned vertically below the primary top surface 3011*a*, such as on opposite sides of a subordinate or lower top surface 3011*b*.

The tapering shape of the retaining surfaces 3050 allows the top cap 3010 to clamp against the bottom edges or sides of the receptacle, such as when the receptacle is a generally cylindrical shape (e.g., a paint can). The surfaces 3050*a-d* can define an overhang or other hook-like shape so that a bottom lip or laterally protruding edge of a receptacle can be held by the surfaces 3050 and prevented from vertical removal from the top cap 3010 via an interference fit. Thus, the receptacle can at least partially be inserted under downward-facing portions of a pair of retaining surfaces 3050*a-b* or 3050*c-d*.

In top cap 110, the retaining surfaces 150 can be positioned adjacent to a rear wall 152 of the top cap 110. The rear wall 152 can help limit movement of liquid or other small debris from passing from the top surface of the top cap 110 into the tray 112. In top cap 3010, a front wall 3052 can limit movement of objects or liquids from moving off of the front end of the top cap 3010 (i.e., toward the rungs). A rear side of the top cap 3010 may thus lack a rear wall (e.g., similar to 152), thereby allowing runoff to move into the tray 3012 (e.g., to receptacle 3054) from the top cap 3010.

The receptacle 3054 may include a reinforcement web 3056 to stiffen the front wall and bottom wall of the receptacle 3054 and to provide stability to the tray 3012 and objects supported by the tray 3012. The web 3056 may therefore have a triangular shape spanning from and integrated with or affixed to a front wall and bottom wall of the receptacle 3054. The reinforcement web 3056 can also at least partially partition the receptacle 3054 into sections, wherein small objects (e.g., screws and nails) can be divided into different lateral sides of the receptacle 3054. Additionally, the tray 3012 may have an upward tilt at its outer rear end (e.g., the outer side opposite the top cap 3010 can be higher than its inner side coupled with the top cap), so objects in the receptacle 3054 can be configured to roll toward the top cap on either side of the web 3056 and thereby remain divided into their respective partitions of the receptacle 3054. The outer upward tilt of the tray 3012 may also allow the tray 3012 to support more weight without sagging below a horizontal angle than would otherwise be possible. In other words, a downward force (e.g., a load of weight) on the tray 3012 may cause the tray 3012 to at least partially rotate or bend downward at the outer end, and a slight upward angle of the tray 3012 relative to the hinge or relative to the top cap 3010 can help prevent excessive downward rotation, sliding or rolling of objects off of the tray 3012, etc.

The tray 3012 may also comprise at least one end hook 3058. An end hook 3058 can be positioned at an outer corner of the tray 3012 opposite the hinge and top cap 3010. The end hook 3058 can protrude upward and provide a position for hanging objects (e.g., objects hung by strings or loops) from the tray 3012. For example, a bag (e.g., a plastic bag) can have handles or straps hooked to the end hooks 3058 to hang beneath the convertible compartment 3022 of the tray 3012. The convertible compartment 3022 can otherwise have the same features and characteristics as convertible compartment 122.

In some embodiments, the tray 3012 may comprise at least one tray stop block 3060 configured to extend upward from a hinge portion 3062 of the tray 3012 adjacent to the top cap 3010 at a top cap stop block 3064. The detail view of FIG. 33 (located at box 33 in FIG. 30) shows the interface of the tray stop block 3060 and the top cap stop block 3064 at the hinge portion 3062 connecting the tray 3012 to the top cap 3010. The tray stop block 3060 may act as a protrusion or blocking member that protrudes radially away from the axis of rotation of the tray 3012 relative to other nearby portions of the hinge portion 3062 (e.g., the rounded end surface of hinge portion 3062 shown in the figures). The tray 3012 may therefore rotate relative to the top cap 3010 between a collapsed or folded-down position (similar to FIG. 22) and a horizontally deployed position (the position of FIG. 33) without the rounded surface of the hinge portion 3062 being prevented from rotation. Upon reaching the horizontally deployed position, the tray stop block 3060 may move into contact with the top cap stop block 3064, thereby mechanically interfering with any further upward rotation of the tray 3012 relative to the top cap 3010 (e.g., to the position of FIG. 14). Thus, the tray stop block 3060 and the top cap stop block 3064 can be configured to come into contact with each other to limit rotation of the tray 3012 beyond a predetermined range of rotation of the tray 3012 relative to the top cap 3010. The predetermined range of rotation may be limited to a minor amount of upward rotation of the tray 3012 beyond being exactly horizontal (to allow a few degrees of upward tilt, as described above), and not permit significant rotational displacement, such as to a position parallel to the front rails. In some embodiments, the maximum upward tilt, in a locked position of the tray 3012 relative to the top cap 3010, is limited to a position within a range of about 1 degree to about 5 degrees. In some embodiments, the upward tilt can be limited to about 10 degrees or less, or within a range of about 1 degree to about 10 degrees.

In some embodiments, the top cap stop block 3064 can form an overhanging member with an open underside (i.e., underside surface 3066). The underside surface 3066 can face vertically downward and cover an open space 3068 between the tray 3012 and the top cap 3010. The top cap stop block 3064 can therefore help prevent objects, debris, appendages, etc. from passing into the open space 3068.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A ladder, comprising:

a first assembly including a first pair of rails and a plurality of rungs extending between and coupled to the first pair of rails;

a second assembly including a second pair of rails, the second pair of rails being pivotally displaceable relative to the first pair of rails between a collapsed configuration and an expanded configuration;

a top cap coupled to the first pair of rails; and a tray coupled to and extending rearward from the top cap, the tray comprising a convertible compartment having a top opening, a through-hole bottom aperture aligned with the top opening, and a panel rotatable between a first position exposing the through-hole bottom aperture and a second position covering the through-hole bottom aperture and defining a bottom surface of the convertible compartment, the bottom surface facing downward relative to the tray.

2. The ladder of claim 1, wherein the panel comprises a tab insertable into a retention recess formed in the tray.

3. The ladder of claim 1, wherein a part of the panel is resiliently deflectable to lock the panel relative to the tray.

4. The ladder of claim 1, wherein the tray further comprises a set of attachment points at a top end of the convertible compartment.

5. The ladder of claim 1, further comprising at least one clamp movable between a retention position and a release position relative to the top cap or the tray.

6. The ladder of claim 5, wherein the at least one clamp is rotatable between the release position and the retention position.

7. The ladder of claim 5, wherein the at least one clamp is lockable in the retention position.

8. The ladder of claim 5, wherein the at least one clamp is positioned above a top surface of the tray adjacent to the convertible compartment.

9. The ladder of claim 5, wherein the at least one clamp is positioned on a front surface of the top cap.

10. The ladder of claim 1, further comprising a ferromagnetic component positioned adjacent to the convertible compartment.

11. The ladder of claim 10, wherein the ferromagnetic component is positioned on or in a sidewall of the convertible compartment.

* * * * *